(12) United States Patent
Lin et al.

(10) Patent No.: US 11,363,643 B2
(45) Date of Patent: Jun. 14, 2022

(54) RANDOM ACCESS PROCEDURES FOR SATELLITE COMMUNICATIONS

(71) Applicant: Telefonaktiebolaget LM Ericsson (publ), Stockholm (SE)

(72) Inventors: Xingqin Lin, Santa Clara, CA (US); Shiwei Gao, Nepean (CA); Helka-Liina Määttänen, Helsinki (FI); Siva Muruganathan, Stittsville (CA); Jonas Sedin, Sollentuna (SE); Hazhir Shokri Razaghi, Solna (SE); Zhenhua Zou, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/267,546

(22) PCT Filed: Aug. 7, 2019

(86) PCT No.: PCT/IB2019/056739
§ 371 (c)(1),
(2) Date: Feb. 10, 2021

(87) PCT Pub. No.: WO2020/031120
PCT Pub. Date: Feb. 13, 2020

(65) Prior Publication Data
US 2021/0321464 A1 Oct. 14, 2021

Related U.S. Application Data

(60) Provisional application No. 62/717,359, filed on Aug. 10, 2018.

(51) Int. Cl.
*H04W 74/08* (2009.01)
*H04W 76/11* (2018.01)
(Continued)

(52) U.S. Cl.
CPC ..... *H04W 74/0841* (2013.01); *H04W 56/0075* (2013.01); *H04W 76/11* (2018.02); *H04W 84/06* (2013.01)

(58) Field of Classification Search
CPC ..... H04W 52/146; H04W 72/042; H04W 4/70; H04L 5/001
See application file for complete search history.

(56) References Cited

U.S. PATENT DOCUMENTS 8,599,706 B2    12/2013   Damnjanovic et al.
9,210,664 B2    12/2015   Dinan
(Continued)

FOREIGN PATENT DOCUMENTS

EP    2827660 A1    1/2015
WO    2012106798 A1    8/2012
(Continued)

OTHER PUBLICATIONS

Author Unknown, "Technical Specification Group Radio Access Network; Study on New Radio (NR) to support non terrestrial networks (Release 15)," Technical Report 38.811, Version 1.0.0, 3GPP Organizational Partners, Jun. 2018, 136 pages.
(Continued)

*Primary Examiner* — Jamal Javaid
(74) *Attorney, Agent, or Firm* — Withrow & Terranova, PLLC

(57) ABSTRACT

Systems and methods are disclosed for random access in a wireless communication system such as, e.g., a wireless communication system having a non-terrestrial (e.g., satellite-based) radio access network. Embodiments of a method performed by a wireless device and corresponding embodiments of a wireless device are disclosed. In some embodiments, a method performed by a wireless device for random access comprises performing an open-loop timing advance
(Continued)

estimation procedure to thereby determine an open-loop timing advance estimate for an uplink between the wireless device and a base station. The method further comprises transmitting a random access preamble using the open-loop timing advance estimate. In this manner, random access can be performed even in the presence of a long propagation delay such as that present in a satellite-based radio access network. Embodiments of a method performed by a base station and corresponding embodiments of a base station are also disclosed.

14 Claims, 23 Drawing Sheets

(51) Int. Cl.
  *H04W 56/00* (2009.01)
  *H04W 84/06* (2009.01)

(56) References Cited

U.S. PATENT DOCUMENTS

| | | | |
|---|---|---|---|
| 9,820,244 B2* | 11/2017 | Earnshaw | H04W 56/001 |
| 2013/0258862 A1 | 10/2013 | Dinan | |
| 2013/0272229 A1 | 10/2013 | Dinan | |
| 2016/0380736 A1 | 12/2016 | Ahn et al. | |
| 2017/0135134 A1 | 5/2017 | Rune et al. | |
| 2019/0159149 A1* | 5/2019 | Ryu | H04W 56/0045 |

FOREIGN PATENT DOCUMENTS

| | | |
|---|---|---|
| WO | 2016057195 A1 | 4/2016 |
| WO | 2019103833 A1 | 5/2019 |
| WO | 2019161044 A1 | 8/2019 |

OTHER PUBLICATIONS

Thales, "RP-181370: Study on solutions evaluation for NR to support Non Terrestrial Network," Third Generation Partnership Project (3GPP), TSG RAN meeting #80, Jun. 11-14, 2018, 5 pages, La Jolla, USA.

Invitation to Pay Additional Fees and Partial Search for International Patent Application No. PCT/IB2019/056739, dated Nov. 29, 2019, 13 pages.

International Search Report and Written Opinion for International Patent Application No. PCT/IB2019/056739, dated Feb. 5, 2020, 18 pages.

Guidotti, A. et al., "Architectures and Key Technical Challenges for 5G Systems Incorporating Satellites," arXiv: 1806.02088v1 [cs.NI], Jun. 6, 2018, 18 pages.

Nomor Research GmbH et al., "R2-1813615: Considerations on MAC Control Loops and Timings in Non-Terrestrial Networks (NTN)," Third Generation Partnership Project (3GPP), TSG-RAN WG2 Meeting #103-Bis, Oct. 8-12, 2018, Chengdu, China, 6 pages.

Nomor Research GmbH et al., "R2-1813617: Considerations on PDCP Control Loops and Timings in Non-Terrestrial Networks (NTN)," Third Generation Partnership Project (3GPP), TSG-RAN WG2 Meeting #103-Bis, Oct. 8-12, 2018, Chengdu, China, 3 pages.

Samsung, "R1-1804395: Considerations on random access for NTN," Third Generation Partnership Project (3GPP), TSG RAN WG1 Meeting #92b, Apr. 16-20, 2018, Sanya, China, 4 pages.

International Search Report and Written Opinion for International Patent Application No. PCT/IB2019/057946, dated Nov. 25, 2019, 19 pages.

Examination Report for Indian Patent Application No. 202117005896, dated Jan. 28, 2022, 13 pages.

\* cited by examiner

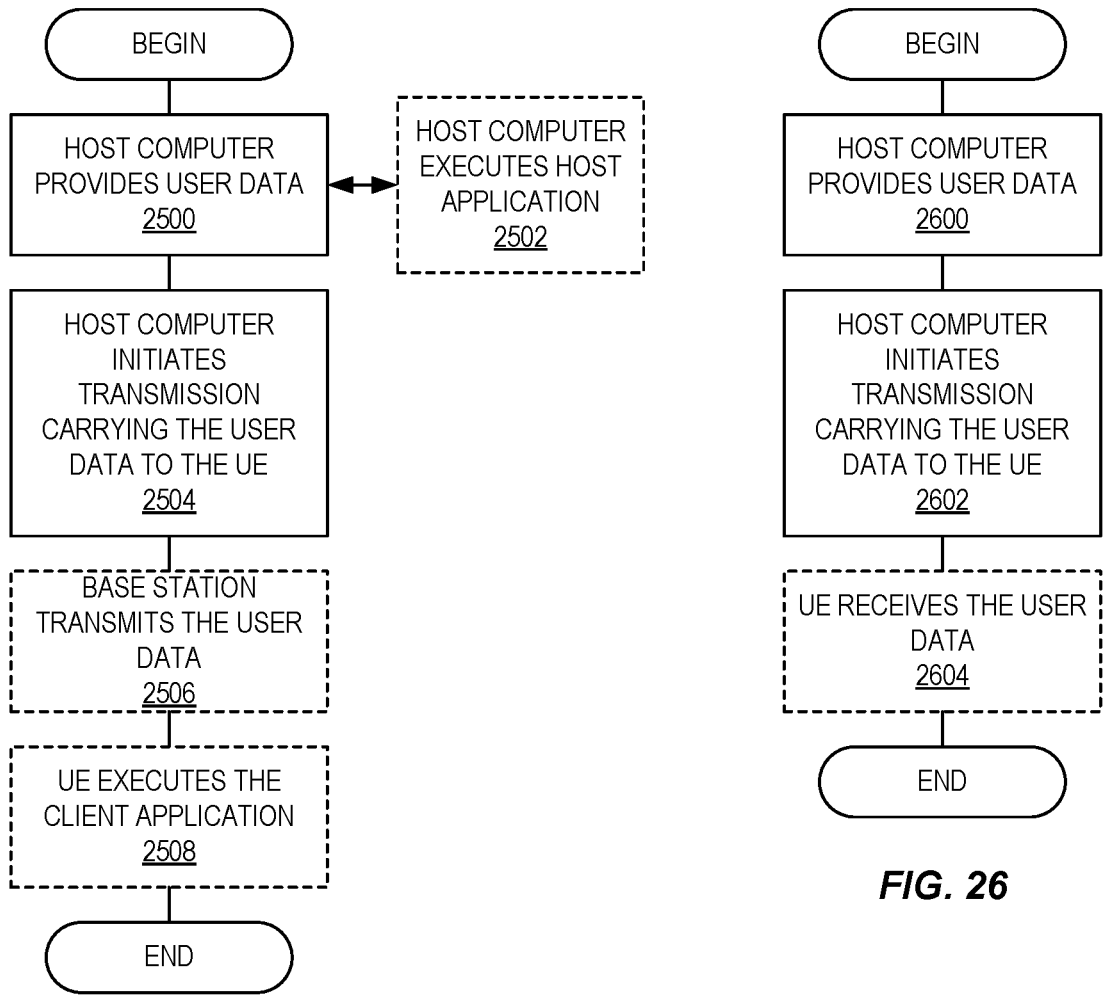

RANDOM ACCESS PROCEDURES FOR SATELLITE COMMUNICATIONS

RELATED APPLICATIONS

This application is a 35 U.S.C. § 371 national phase filing of International Application No. PCT/IB2019/056739, filed Aug. 7, 2019, which claims the benefit of provisional patent application Ser. No. 62/717,359, filed Aug. 10, 2018, the disclosures of which are hereby incorporated herein by reference in their entireties.

TECHNICAL FIELD

The present disclosure relates to random access in a wireless communications system that includes a non-terrestrial (e.g., satellite-based) radio access network.

BACKGROUND

There is an ongoing resurgence of satellite communications. Several plans for satellite networks have been announced in the past few years. The target services vary from backhaul and fixed wireless, to transportation, to outdoor mobile, to Internet of Things (IoT). Satellite networks could complement mobile networks on the ground by providing connectivity to underserved areas and multicast/broadcast services.

To benefit from the strong mobile ecosystem and economy of scale, adapting the terrestrial wireless access technologies including Long Term Evolution (LTE) and New Radio (NR) for satellite networks is drawing significant interest. For example, Third Generation Partnership Project (3GPP) completed an initial study in Release 15 on adapting NR to support non-terrestrial networks, mainly satellite networks [1]. This initial study focused on the channel model for the non-terrestrial networks, defining deployment scenarios, and identifying the key potential impacts. 3GPP is conducting a follow-up study item in Release 16 on solutions evaluation for NR to support non-terrestrial networks [2].

Satellite Communications

A satellite radio access network usually includes the following components:
- a gateway that connects a satellite network to a core network,
- a satellite that refers to a space-borne platform,
- a terminal that refers to a User Equipment (UE),
- a feeder link that refers to the link between a gateway and a satellite, and
- a service link that refers to the link between a satellite and a terminal.

The link from the gateway to the terminal is often called a "forward link", and the link from the terminal to the gateway is often called a "return link" or "access link." Depending on the functionality of the satellite in the system, two transponder options can be considered:

Bent pipe transponder: The satellite forwards the received signal back to the earth with only amplification and a shift from uplink frequency to downlink frequency.

Regenerative transponder: The satellite includes on-board processing to demodulate and decode the received signal and regenerate the signal before sending it back to the earth.

Depending on the orbit altitude, a satellite may be categorized as a Low Earth Orbit (LEO), Medium Earth Orbit (MEO), or Geostationary Orbit (GEO) satellite.
- LEO: typical heights ranging from 500-1,500 kilometers (km), with orbital periods ranging from 10-40 minutes.
- MEO: typical heights ranging from 5,000-12,000 km, with orbital periods ranging from 2-8 hours.
- GEO: height at 35,786 km, with an orbital period of 24 hours.

A satellite typically generates several beams over a given area. The footprint of a beam is usually in an elliptical shape, which has been traditionally considered as a cell. The footprint of a beam is also often referred to as a spotbeam. The footprint of a spotbeam may move over the earth's surface with the satellite movement or may be earth fixed with some beam pointing mechanism used by the satellite to compensate for its motion. The size of a spotbeam depends on the system design, which may range from tens of kilometers to a few thousands of kilometers.

FIG. 1 shows an example architecture of a satellite network with bent pipe transponders.

The two main physical phenomena that affect satellite communications system design are the long propagation delay and Doppler effects. The Doppler effects are especially pronounced for LEO satellites.

Propagation Delays

Propagation delay is a main physical phenomenon in a satellite communications system that makes the design different from that of a terrestrial mobile system. For a bent pipe satellite network, the following delays are relevant:

One-way delay: The one-way delay is the delay from the Base Station (BS) to the UE via the satellite, or the other way around.

Round-trip delay: The round-trip delay is the delay from the BS to the UE via the satellite and from the UE back to the BS via the satellite.

Differential delay: The differential delay is the delay difference of two selected points in the same spotbeam.

Note that there may be additional delay between the ground BS antenna and the BS, which may or may not be collocated. This delay depends on deployment. If the delay cannot be ignored, it should be taken into account in the communications system design.

The propagation delay depends on the length of the signal path, which further depends on the elevation angles of the satellite seen by the BS and UE on the ground. The minimum elevation angle is typically more than 10° for UE and more than 5° for BS on the ground. These values will be assumed in the delay analysis below.

The following Tables 1 and 2 are taken from 3GPP Technical Report (TR) 38.811 [1]. As can be seen, the round-trip delay is much larger in satellite systems. For example, it is about 545 milliseconds (ms) for a GEO satellite system. In contrast, the round-trip time is normally no more than 1 ms for typical terrestrial cellular networks.

TABLE 1

Propagation delays for GEO satellite at 35,786 km
(extracted from Table 5.3.2.1-1 in 3GPP TR 38.811 [1])

| | GEO at 35786 km | | |
|---|---|---|---|
| Elevation angle | Path | D (km) | Time (ms) |
| UE: 10° | satellite-UE | 40586 | 135.286 |
| GW: 5° | satellite-gateway | 41126.6 | 137.088 |
| 90° | satellite-UE | 35786 | 119.286 |
| | Bent Pipe satellite | | |
| One way delay | Gateway-satellite_UE | 81712.6 | 272.375 |
| Round trip Time | Twice | 163425.3 | 544.751 |
| | Regenerative Satellite | | |
| One way delay | Satellite-UE | 40586 | 135.286 |
| Round Trip Time | Satellite-UE-Satellite | 81172 | 270.572 |

TABLE 2

Propagation delays for NGSO satellites (extracted from
Table 5.3.4.1-1 in 3GPP TR 38.811 [1])

| | | LEO at 600 km | | LEO at 1500 km | | MEO at 10000 km | |
|---|---|---|---|---|---|---|---|
| Elevation angle | Path | Distance D (km) | Delay (ms) | Distance D (km) | Delay (ms) | Distance D (km) | Delay (ms) |
| UE: 10° | satellite-UE | 1932.24 | 6,440 | 3647.5 | 12,158 | 14018.16 | 46.727 |
| GW: 5° | satellite-gateway | 2329.01 | 7.763 | 4101.6 | 13.672 | 14539.4 | 48.464 |
| 90° | satellite-UE | 600 | 2 | 1500 | 5 | 10000 | 33.333 |
| | Bent pipe satellite | | | | | | |
| One way delay | Gateway-satellite UE | 4261.2 | 14.204 | 7749.2 | 25.83 | 28557.6 | 95.192 |
| Round Trip Delay | Twice | 8522.5 | 28.408 | 15498.4 | 51.661 | 57115.2 | 190.38 |
| | Regenerative satellite | | | | | | |
| One way delay | Satellite-UE | 1932.24 | 6.44 | 3647.5 | 12.16 | 14018.16 | 46.73 |
| Round Trip Delay | Satellite-UE-Satellite | 3864.48 | 12.88 | 7295 | 24.32 | 28036.32 | 93.45 |

Generally, within a spotbeam covering one cell, the delay can be divided into a common delay component and a differential delay component. The common delay is the same for all UEs in the cell and is determined with respect to a reference point in the spotbeam. In contrast, the differential delay is different for different UEs which depends on the propagation delay between the reference point and the point at which a given UE is positioned within the spotbeam.

The differential delay is mainly due to the different path lengths of the access links, since the feeder link is normally the same for terminals in the same spotbeam. Further, the differential delay is mainly determined by the size of the spotbeam. It may range from sub-millisecond for spotbeams on the order of tens of kilometers to tens of milliseconds for spotbeams on the order of thousands of kilometers.

Doppler Effects

Doppler is another major physical phenomenon that shall be properly taken into account in a satellite communications system. The following Doppler effects are particularly relevant:

Doppler shift: The Doppler shift is the shift of the signal frequency due to the motion of the transmitter, the receiver, or both.

Doppler variation rate: The Doppler variation rate is the derivative of the Doppler shift function of time, i.e., it characterizes how fast the Doppler shift evolves over time.

Doppler effects depend on the relative speed of the satellites and the UE and the carrier frequency.

GEO satellites are fixed in principle and thus do not induce Doppler shift. In reality, however, they move around their nominal orbital positions due to, for example, perturbations. A GEO satellite is typically maintained inside a box [1]:

+/−37.5 km in both latitude and longitude directions corresponding to an aperture angle of +/−0.05°
+/−17.5 km in the equatorial plane The trajectory of the GEO satellite typically follows a figure "8" pattern, as illustrated in FIG. 2. FIG. 2 illustrates geostationary satellite trajectory (extracted from FIG. 5.3.2.3-2 in 3GPP TR 38.811 [1]).

Table 3 gives example Doppler shifts of GEO satellites. For a GEO satellite maintained inside the box and moving according to the figure "8" pattern, we can see that the Doppler shifts due to the GEO satellite movement are negligible.

If a GEO satellite is not maintained inside the box, the motion could be near GEO orbit with inclination up to 6°. The Doppler shifts due to the GEO satellite movement may not be negligible.

TABLE 3

Example Doppler shifts of GEO satellites (extracted from
Tables 5.3.2.3-4 and 5.3.2.3-5 in 3GPP TR 38.811 [1])

| | Frequency | 2 GHz | 20 GHz | 30 GHz |
|---|---|---|---|---|
| S2 to S1 | Doppler shift (Hz) | −0.25 | −2.4 | −4.0 |
| S1 to S4 | Doppler shift (Hz) | 2.25 | 22.5 | 34 |
| Not maintained inside the box (with inclination up to 6°) | Doppler shift (Hz) | 300 | 3000 | 4500 |

The Doppler effects become remarkable for MEO and LEO satellites. Table 4 gives example Doppler shifts and rates of Non-GEO (NGSO) satellites. We can see that the Doppler shifts and rates due to the NGSO satellite movement should be properly considered in the communications system design.

TABLE 4

Doppler shits and variation rates of NGSO satellites
(extracted from Table 5.3.4.3.2-7 in 3GPP TR 38.811 [1])

| Frequency (GHz) | Max doppler | Relative Doppler | Max Doppler shift variation | |
|---|---|---|---|---|
| 2 | +/−48 kHz | 0.0024% | −544 Hz/s | LEO at 600 km altitude |
| 20 | +/−480 kHz | 0.0024% | −5.44 kHz/s | |
| 30 | +/−720 kHz | 0.0024% | −8.16 kHz/s | |
| 2 | +/−40 kHz | 0.002% | −180 Hz/s | LEO at 1500 km altitude |
| 20 | +/−400 kHz | 0.002% | −1.8 kHZ/s | |
| 30 | +/−600 kHz | 0.002% | −2.7 kHz/s | |
| 2 | +/−15 kHz | 0.00075% | −6 Hz/s | MEO at 10000 km altitude |
| 20 | +/−150 kHz | 0.00075% | −60 Hz/s | |
| 30 | +/−225 kHz | 0.00075% | −90 Hz/s | |

Random Access Procedures in LTE and NR

The random access procedures in LTE and NR are similar. In the existing random access design, random access procedures serve multiple purposes such as initial access when establishing a radio link, scheduling request, etc. Among others, an important objective of the random access procedures is to achieve uplink synchronization, which is important for maintaining the uplink orthogonality in LTE and NR. To preserve the orthogonality of uplink signals from different UEs in an Orthogonal Frequency Division Multiple Access (OFDMA) based system, the time of arrival of each UE's signal needs to be within the Cyclic Prefix (CP) of the OFDM signal at the base station.

LTE and NR random access can be either contention-based or contention-free. The contention-based random access procedure consists of four steps, as illustrated in FIG. 3. These steps are: (1) the UE transmits a random access preamble, which is also known as Msg1; (2) the network transmits a Random Access Response (RAR), which is also known as Msg2, that contains a Timing Advance (TA) command and the scheduling of uplink resources for the UE to use in the third step; (3) the UE transmits its identity to the network using the scheduled resources in a message known as Msg3; and (4) the network transmits a contention resolution message (also referred to as Msg4) to resolve any contention due to multiple UEs transmitting the same random access preamble in the first step.

For contention-free random access, the UE uses reserved preambles assigned by the BS. In this case, contention resolution is not needed, and thus only steps 1 and 2 are required.

Synchronization Signal (SS) Block Configuration

In NR, the set of Reference Signals (RSs) based on which UE performs initial access is the SS/Physical Broadcast Channel Block (SSB). The structure of the SSB in NR is described below. The signals comprised in the SSB may be used for measurements on an NR carrier, including intra-frequency, inter-frequency, and inter-Radio Access Technology (RAT) (i.e., NR measurements from another RAT).

SSB (can also be referred to as SS/Physical Broadcast Channel (PBCH) block or SS block): NR Primary SS (NR-PSS), NR Secondary SS (NR-SSS), and/or NR-PBCH can be transmitted within an SSB. For a given frequency band, an SSB corresponds to N Orthogonal Frequency Division Multiplexing (OFDM) symbols based on one subcarrier spacing (e.g., default or configured), and N is a constant. The UE is able to identify at least OFDM symbol index, slot index in a radio frame, and radio frame number from an SSB. A single set of possible SSB time locations (e.g., with respect to radio frame or with respect to SS burst set) is specified per frequency band. At least for the multi-beams case, at least the time index of SSB is indicated to the UE. The position(s) of actual transmitted SSBs is informed for helping CONNECTED/IDLE mode measurement, for helping a CONNECTED mode UE to receive downlink data/control in unused SSBs, and potentially for helping an IDLE mode UE to receive downlink data/control in unused SSBs. The maximum number of SSBs within an SS burst set, L, for different frequency ranges are:

For frequency range up to 3 gigahertz (GHz), L is 4
For frequency range from 3 GHz to 6 GHz, L is 8
For frequency range from 6 GHz to 52.6 GHz, L is 64

SS burst set: One or multiple SS burst(s) further compose an SS burst set (or series) where the number of SS bursts within an SS burst set is finite. From a physical layer specification perspective, at least one periodicity of SS burst set is supported. From a UE perspective, SS burst set transmission is periodic. At least for initial cell selection, the UE may assume a default periodicity of SS burst set transmission for a given carrier frequency (e.g., one of 5 ms, 10 ms, 20 ms, 40 ms, 80 ms, or 160 ms). The UE may assume that a given SSB is repeated with a SS burst set periodicity. By default, the UE may neither assume the New Radio BS (gNB) transmits the same number of physical beam(s) nor the same physical beam(s) across different SSBs within an SS burst set. In a special case, an SS burst set may comprise one SS burst.

For each carrier, the SSBs may be time-aligned or overlap fully or at least in part, or the beginning of the SSBs may be time-aligned (e.g., when the actual number of transmitted SSBs is different in different cells).

FIG. 4 illustrates an example configuration of SSBs, SS bursts, and SS burst sets/series.

Problems with Existing Solutions

There currently exist certain challenge(s). In particular, the design in the existing random access procedures in LTE and NR is not suitable for satellite communications systems.

SUMMARY

Systems and methods are disclosed for random access in a wireless communication system such as, e.g., a wireless communication system having a non-terrestrial radio access network (e.g., a satellite-based radio access network). Embodiments of a method performed by a wireless device and corresponding embodiments of a wireless device are disclosed. In some embodiments, a method performed by a wireless device for random access comprises performing an open-loop timing advance estimation procedure to thereby determine an open-loop timing advance estimate for an uplink between the wireless device and a base station. The method further comprises transmitting a random access preamble using the open-loop timing advance estimate. In this manner, random access can be performed even in the presence of a long propagation delay such as that present in a satellite-based radio access network.

In some embodiments, the method further comprises receiving, from the base station, a random access response comprising a timing advance value and determining a timing advance for the uplink between the wireless device and the base station based on the timing advance value comprised in the random access response and the open-loop timing advance estimate. In some embodiments, the random access response schedules resources for an uplink transmission from the wireless device, and the method further comprises transmitting an uplink transmission to the base station using the scheduled resources and the determined timing advance, wherein the uplink transmission comprises an identity of the wireless device and an indication of the open-loop timing advance estimate. In some embodiments, the indication of the open-loop timing advance estimate is the open-loop timing advance estimate. In some other embodiments, the indication of the open-loop timing advance estimate is a differential value that equals a difference between the open-loop timing advance estimate and a predefined or preconfigured reference value.

In some embodiments, the random access preamble is a function of the open-loop timing advance estimate. In some embodiments, the method further comprises selecting the random access preamble from a subgroup of a plurality of possibly random access preambles, the subgroup being chosen based on the open-loop timing advance estimate. In some embodiments, the random access preamble provides an indication of the open-loop timing advance estimate. In some embodiments, the method further comprises receiving, from the base station, a random access response comprising a timing advance value and determining a timing advance for the uplink between the wireless device and the base station based on the timing advance value comprised in the random access response and the open-loop timing advance estimate. In some embodiments, the random access response schedules resources for an uplink transmission from the wireless device, and the method further comprises transmitting an uplink transmission to the base station using the scheduled resources and the determined timing advance, the uplink transmission comprising an identity of the wireless device and information that, together with a random access preamble transmitted by the wireless device, provide an indication of the open-loop timing advance estimate.

In some embodiments, the base station is part of a satellite radio access network comprising a satellite and a gateway that communicatively couples the base station to the satellite.

In some embodiments, a method performed by a wireless device for random access in a radio access network comprises transmitting a random access preamble and receiving, from a base station, a random access response comprising a timing advance value, the timing advance value being greater than 2 milliseconds (ms). In some embodiments, the timing advance value is greater than 10 ms. In some other embodiments, the timing advance value is greater than 50 ms. In some other embodiments, the timing advance value is greater than 100 ms.

In some embodiments, the timing advance value is within a range of $T_{min}$ to $T_{max}$, wherein $T_{min}$ and/or $T_{max}$ are a function of a deployment of the radio access network.

In some embodiments, the base station is part of a satellite radio access network comprising a satellite and a gateway that communicatively couples the base station to the satellite. In some embodiments, the timing advance value is within a range of $T_{min}$ to $T_{max}$, wherein $T_{min}$ and/or $T_{max}$ are a function of whether the satellite is a Low Earth Orbit (LEO), Medium Earth Orbit (MEO), or Geostationary Orbit (GEO) satellite.

In some embodiments, the method further comprises adjusting a timing advance of the wireless device based on the timing advance value comprised in the random access response and transmitting an uplink transmission to the base station using the timing advance.

In some embodiments, the method further comprises adjusting a timing advance of the wireless device based on the timing advance value comprised in the random access response and a configured reference timing and transmitting an uplink transmission to the base station using the timing advance.

In some embodiments, a method performed by a wireless device for random access in a radio access network comprises receiving, from a base station, a reference timing advance, the reference timing advance being based on a largest or smallest possible round-trip signal delay in a service area of the base station and transmitting a random access preamble using a timing advance that is equal to the reference timing advance.

In some embodiments, the method further comprises receiving, from a base station, a random access response comprising information that, together with the reference timing advance, indicates a timing advance value for the wireless device. In some embodiments, the information comprises a number of slots and a fraction of a slot. In some embodiments, the random access response further comprises a random access channel identifier that indicates the random access preamble and a subframe over which the random access preamble was received by the base station. In some embodiments, the method further comprises determining that the random access channel identifier matches the random access preamble transmitted by the wireless device and, upon determining that the random access channel identifier matches the random access preamble transmitted by the wireless device, transmitting an uplink transmission using the timing advance value indicated by the information comprised in the random access response.

In some embodiments, the base station is part of a satellite radio access network comprising a satellite and a gateway that communicatively couples the base station to the satellite.

In some embodiments, a method performed by a wireless device for random access in a radio access network comprises transmitting a random access preamble and receiving, from a base station, a random access response comprising a timing advance value for subframe boundary alignment.

In some embodiments, the timing advance value is one of a range of possible timing advance values, the range of possible timing advance values being −0.5 ms to 0.5 ms. In some other embodiments, the timing advance value is one of a range of possible timing advance values, the range of possible timing advance values being 0 ms to 1.0 ms.

In some embodiments, the method further comprises transmitting, to the base station, an indication that the wireless device is capable of performing open-loop timing advance estimation. In some embodiments, the method further comprises transmitting, to the base station, an indication that the wireless device is capable of estimating propagation delay, differential delay, or both propagation delay and differential delay. In some embodiments, the indication is transmitted during random access or outside of random access.

In some embodiments, the base station is part of a satellite radio access network comprising a satellite and a gateway that communicatively couples the base station to the satellite.

In some embodiments, a method performed by a wireless device for random access in a radio access network comprises transmitting an indication to a base station that the wireless device is capable of performing open-loop timing advance estimation. In some embodiments, the base station is part of a satellite radio access network comprising a satellite and a gateway that communicatively couples the base station to the satellite.

In some embodiments, a method performed by a wireless device for random access in a radio access network comprises transmitting a random access preamble, receiving, from a base station, a random access response comprising information that indicates a processing latency at the base station between reception of the random access preamble by the base station and transmission of the random access response by the base station, and estimating a round-trip propagation delay of the wireless device by subtracting the processing latency at the base station from a time duration between transmission of the random access preamble at the wireless device and receiving the random access response at the wireless device.

In some embodiments, the random access response further comprises an extended timing advance value. In some embodiments, the extended timing advance value is from a range of possible extended timing advance values of –0.5 ms to 0.5 ms.

In some embodiments, random access preambles are divided into N preamble groups each assigned one subframe to provide a subframe pattern that is repeated every M subframes where M≥N, and the method further comprises obtaining system information comprising N, M, and a reference timing value, selecting the random access preamble from one of the N preamble groups that corresponds to a subframe in which the random access preamble is to be transmitted, and selecting a random access radio network temporary identifier, the random access radio network temporary identifier being a function of the one of the N preamble groups from which the random access preamble was selected and M. Transmitting the random access preamble comprises transmitting the random access preamble in the subframe that corresponds to the one of the N preamble groups from which the random access preamble was selected.

In some embodiments, the base station is part of a satellite radio access network comprising a satellite and a gateway that communicatively couples the base station to the satellite.

In some embodiments, a wireless device for performing random access in a radio access network is adapted to perform any one of the embodiments of the method of operation of a wireless device described above. In some embodiments, the wireless device comprises one or more transmitters, one or more receivers, and processing circuitry associated with the one or more transmitters and the one or more receivers, wherein the processing circuitry configured to cause the wireless device to perform any one of the embodiments of the method of operation of a wireless device described above.

Embodiments of a method performed by a base station and corresponding embodiments of a base station are also disclosed. In some embodiments, a method performed by a base station for enabling random access in a radio access network comprises detecting a random access preamble from a wireless device, transmitting a random access response comprising a timing advance value, and receiving, from the wireless device, an uplink transmission, wherein the uplink transmission comprises an identity of the wireless device and an indication of an open-loop timing advance estimate utilized by the wireless device to transmit the random access preamble. In some embodiments, the base station is part of a satellite radio access network comprising a satellite and a gateway that communicatively couples the base station to the satellite.

In some embodiments, a method performed by a base station for enabling random access in a radio access network comprises detecting a random access preamble from a wireless device, the random access preamble being a function of an open-loop timing advance estimate of the wireless device and transmitting, to the wireless device, a random access response comprising a timing advance value.

In some embodiments, the random access preamble is from a subgroup of a plurality of possibly random access preambles, the subgroup being indicative of the open-loop timing advance estimate.

In some embodiments, the random access preamble provides an indication of the open-loop timing advance estimate.

In some embodiments, the method further comprises receiving, from the wireless device, an uplink transmission comprising an identity of the wireless device and information that, together with the random access preamble transmitted by the wireless device, provide an indication of the open-loop timing advance estimate.

In some embodiments, the base station is part of a satellite radio access network comprising a satellite and a gateway that communicatively couples the base station to the satellite.

In some embodiments, a method performed by a base station for enabling random access in a radio access network comprises detecting a random access preamble from a wireless device and transmitting, to the wireless device, a random access response comprising a timing advance value, the timing advance value being greater than 2 ms.

In some embodiments, the timing advance value is greater than 10 ms. In some embodiments, the timing advance value is greater than 50 ms. In some embodiments, the timing advance value is greater than 100 ms.

In some embodiments, the timing advance value is within a range of $T_{min}$ to $T_{max}$, wherein $T_{min}$ and/or $T_{max}$ are a function of a deployment of the radio access network.

In some embodiments, the base station is part of a satellite radio access network comprising a satellite and a gateway that communicatively couples the base station to the satellite. In some embodiments, the timing advance value is within a range of $T_{min}$ to $T_{max}$, wherein $T_{min}$ and/or $T_{max}$ are a function of whether the satellite is a LEO, MEO, or GEO satellite.

In some embodiments, a method performed by a base station for enabling random access in a radio access network comprises transmitting, to one or more wireless devices, a reference timing advance, wherein the reference timing advance is based on a largest or smallest possible round-trip signal delay in a service area of the base station. The method further comprises detecting a random access preamble from a wireless device and transmitting, to the wireless device, a random access response comprising information that, together with the reference timing advance, indicates a timing advance value for the wireless device. In some embodiments, detecting the random access preamble from the wireless device comprise detecting the random access preamble from the wireless device within a time window that covers the largest and smallest possible round-trip signal delay in the service area, and the method further comprises, based on the detected random access preamble, determining the timing advance value for the detected random access preamble using a start of a last or first subframe in the time window as a timing reference. In some embodiments, the information comprises a number of slots and a fraction of a slot.

In some embodiments, the random access response further comprises a random access channel identifier that indicates the random access preamble and a subframe over which the random access preamble was received by the base station.

In some embodiments, the base station is part of a satellite radio access network comprising a satellite and a gateway that communicatively couples the base station to the satellite.

In some embodiments, a method performed by a base station for enabling random access in a radio access network comprises detecting a random access preamble from a wireless device and transmitting, to the wireless device, a random access response comprising a timing advance value for subframe boundary alignment.

In some embodiments, the timing advance value is one of a range of possible timing advance values, the range of possible timing advance values being −0.5 ms to 0.5 ms. In some other embodiments, the timing advance value is one of a range of possible timing advance values, the range of possible timing advance values being 0 ms to 1.0 ms.

In some embodiments, the method further comprises receiving, from the wireless device, an indication that the wireless device is capable of performing open-loop timing advance estimation. In some embodiments, the indication is received during random access or outside of random access.

In some embodiments, the base station is part of a satellite radio access network comprising a satellite and a gateway that communicatively couples the base station to the satellite.

In some embodiments, a method performed by a base station for enabling random access in a radio access network comprises receiving, from a wireless device, an indication that the wireless device is capable of performing open-loop timing advance estimation. In some embodiments, the base station is part of a satellite radio access network comprising a satellite and a gateway that communicatively couples the base station to the satellite.

In some embodiments, a method performed by a base station for enabling random access in a radio access network comprises detecting a random access preamble from a wireless device and transmitting, to the wireless device, a random access response comprising information that indicates a processing latency at the base station between reception of the random access preamble by the base station and transmission of the random access response by the base station.

In some embodiments, the random access response further comprises an extended timing advance value. In some embodiments, the extended timing advance value is from a range of possible extended timing advance values of −0.5 ms to 0.5 ms.

In some embodiments, random access preambles are divided into N preamble groups each assigned one subframe to provide a subframe pattern that is repeated every M subframes where M≥N, and the method further comprises providing, to the wireless device, system information comprising N, M, and a reference timing value. Further, the random access preamble is from one of the N preamble groups that corresponds to a subframe in which the random access preamble is detected, and a random access radio network temporary identifier associated with the random access preamble is a function of the one of the N preamble groups from which the random access preamble was selected and M.

In some embodiments, the base station is part of a satellite radio access network comprising a satellite and a gateway that communicatively couples the base station to the satellite.

In some embodiments, a base station for enabling random access in a radio access network is adapted to perform any one of the embodiments of the method performed by a base station described above. In some embodiments, the base station comprises processing circuitry configured to cause the base station to perform any one of the embodiments of the method performed by a base station described above.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 25 through 28 are flow charts that illustrate example methods implemented in a communication system.

DETAILED DESCRIPTION

Figure 1:
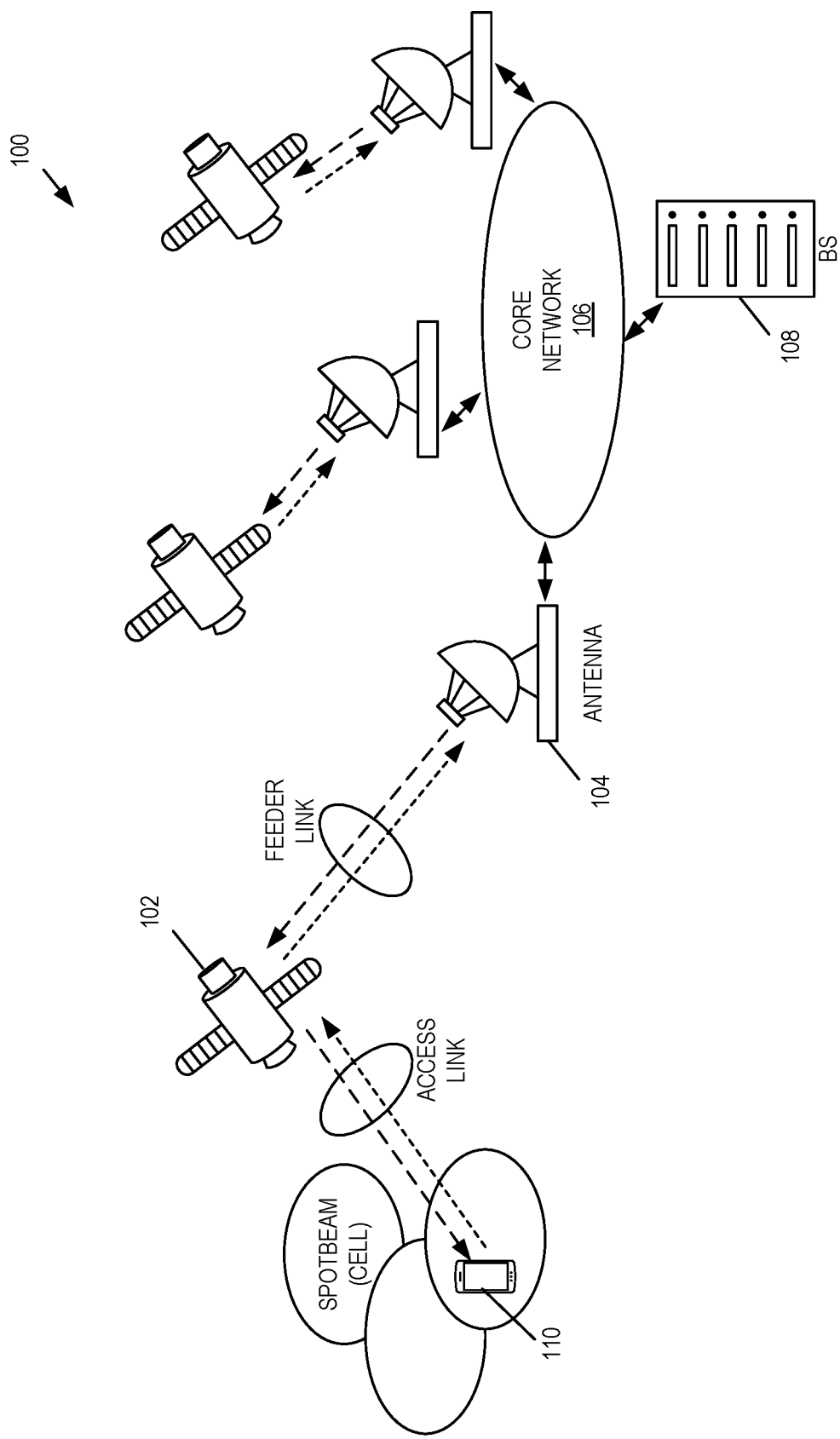
FIG. 1 shows an example architecture of a satellite network with bent pipe transponders.
Figure 2:
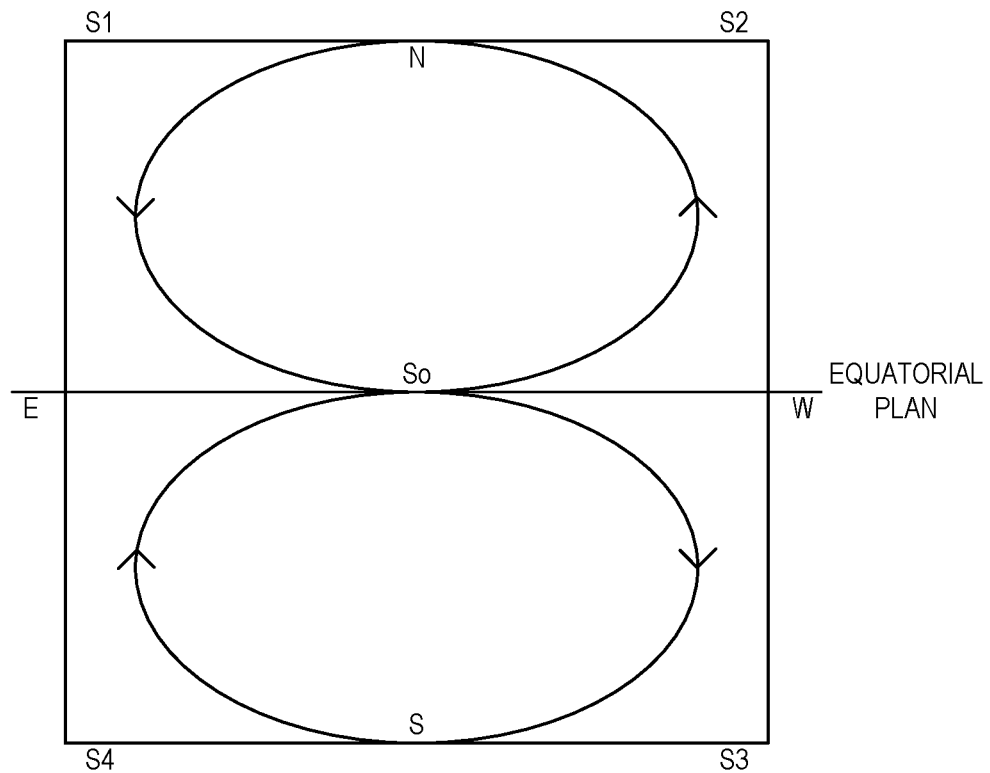
FIG. 2 illustrates geostationary satellite trajectory.
Figure 3:
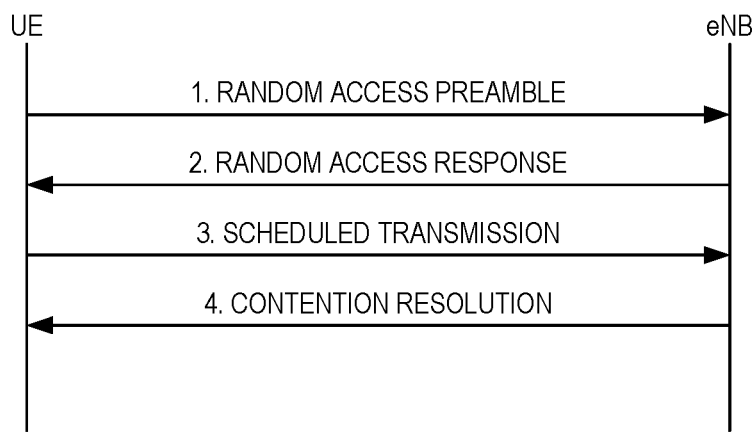
FIG. 3 illustrates a contention-based random access procedure.
Figure 4:
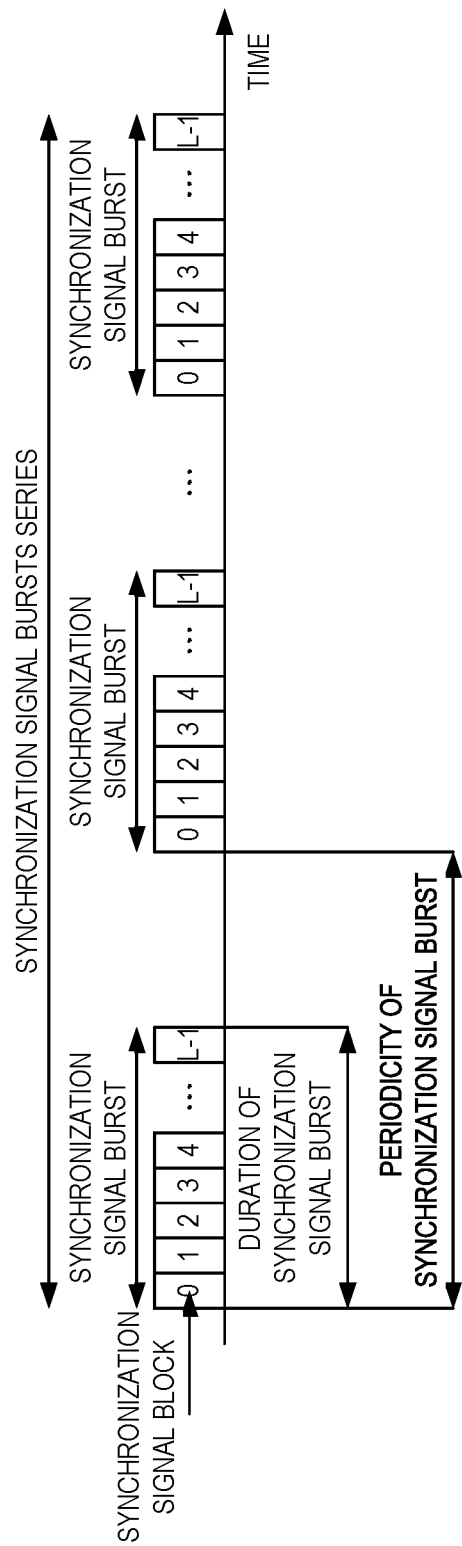
FIG. 4 illustrates an example configuration of Synchronization Signal Blocks (SSBs), Synchronization Signal (SS) bursts, and SS burst sets/series.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

In the embodiments below, when it is stated that "BS configures . . . ", we mean that the Base Station (BS) configures the corresponding subjects in the system information.

As discussed above, the design in the existing random access procedures in LTE and NR is not suitable for satellite communications systems. In particular, the timing relationship is based on the terrestrial propagation radio environment, where the round-trip delay is usually within 1 millisecond (ms). As a result, it cannot handle the long propagation delays in satellite communications systems that range from tens of milliseconds (Low Earth Orbit (LEO)) to hundreds of milliseconds (Geostationary Orbit (GEO)), and the large differential delay in a spotbeam in satellite communications systems that may range from sub-milliseconds to tens of milliseconds (depending on the size of spotbeam).

Certain aspects of the present disclosure and their embodiments may provide solutions to the aforementioned or other challenges. In this disclosure, systems and methods are disclosed for adapting random access procedures in LTE and NR for satellite networks.

The proposed solutions for random access procedures consider both the case when UE can perform open-loop timing estimation and the case when the base station utilizes implementation-based solutions to estimate the long propagation delay and/or large differential delay.

In some embodiments, methods are disclosed for adapting random access procedures currently designed for terrestrial networks to deal with the long propagation delay that exists in, for example, satellite communications systems.

Some non-limiting examples of embodiments disclosed herein are as follows:

Embodiment 1: A method of a random access procedure where the UE performs open-loop Timing Advance (TA) estimation and applies the estimated TA before sending a random access preamble in Msg1; further adjusts TA based on closed-loop feedback from the BS in Msg2; and informs the BS about its open-loop timing estimate in Msg3.

Embodiment 2: A method of a random access procedure where the UE performs open-loop TA estimation and applies the estimated TA before sending a random access preamble in Msg1; chooses a TA dependent Physical Random Access Channel (PRACH) transmission resource in a subframe based on an open-loop timing estimate to send Msg1; further adjusts TA based on closed-loop feedback from the BS in Msg2; and informs the BS about its remaining information on the open-loop timing estimate in Msg3 if the information is not completely carried by the selection of the transmission resource in Msg1.

Embodiment 3: A method of a random access procedure where the UE performs TA by combining the timing information broadcast in System Information (SI) and TA command transmitted in Msg2.

Embodiment 4: A method of a random access procedure where the UE indicates its open-loop timing estimate capability to the network.

Embodiment 5: A method of a random access procedure where the BS indicates to the UE its processing latency between the reception time of Msg1 at the BS and the transmission time of Msg2 at the BS; the UE estimates its round-trip propagation delay by subtracting the BS processing latency from the time duration between the transmission time of Msg1 at the UE and the reception time of Msg2 at the UE.

Certain embodiments may provide one or more of the following technical advantage(s). The proposed solutions for a random access procedure deal with the core physical phenomenon of long propagation delay in satellite communications systems. The solutions are key for adapting LTE and NR for satellite networks.

The embodiments of the UE and BS as well as the embodiments of the method of operation thereof described herein may be implemented in any suitable type of wireless communication system such as, e.g., a cellular communications network including a satellite radio access network 100 such as that illustrated in FIG. 1. As illustrated in FIG. 1, the satellite radio access network 100 includes a satellite 102 (i.e., a space or airborne radio access node or platform), one or more gateways 104 that interconnect the satellite 102 to a core network 106, and/or a land-based BS component 108. The functionality of the BS described herein may be implemented in the satellite 102 or distributed between the satellite 102 and a land-based BS component 108 connected to the satellite 102 via the gateway 104 (e.g., the satellite 102 may implement L1 functionality and the land-based BS component 108 may implement L2 and L3 functionality). A UE 110 communicates with the satellite radio access network 100 via the satellite 102. The functionality of a UE as described herein may be implemented in the UE 110.

Embodiment 1

A UE performs an open-loop TA estimate. The UE applies TA using the open-loop TA estimate before sending Msg1 in the random access procedure. A BS sends back a closed-loop timing adjustment command in Msg2. This command includes a TA value. The UE adjusts its TA based on the command received in Msg2 before sending Msg3 to the BS. The UE includes its open-loop timing estimate in Msg3 to facilitate BS scheduling henceforth.

Figure 5:
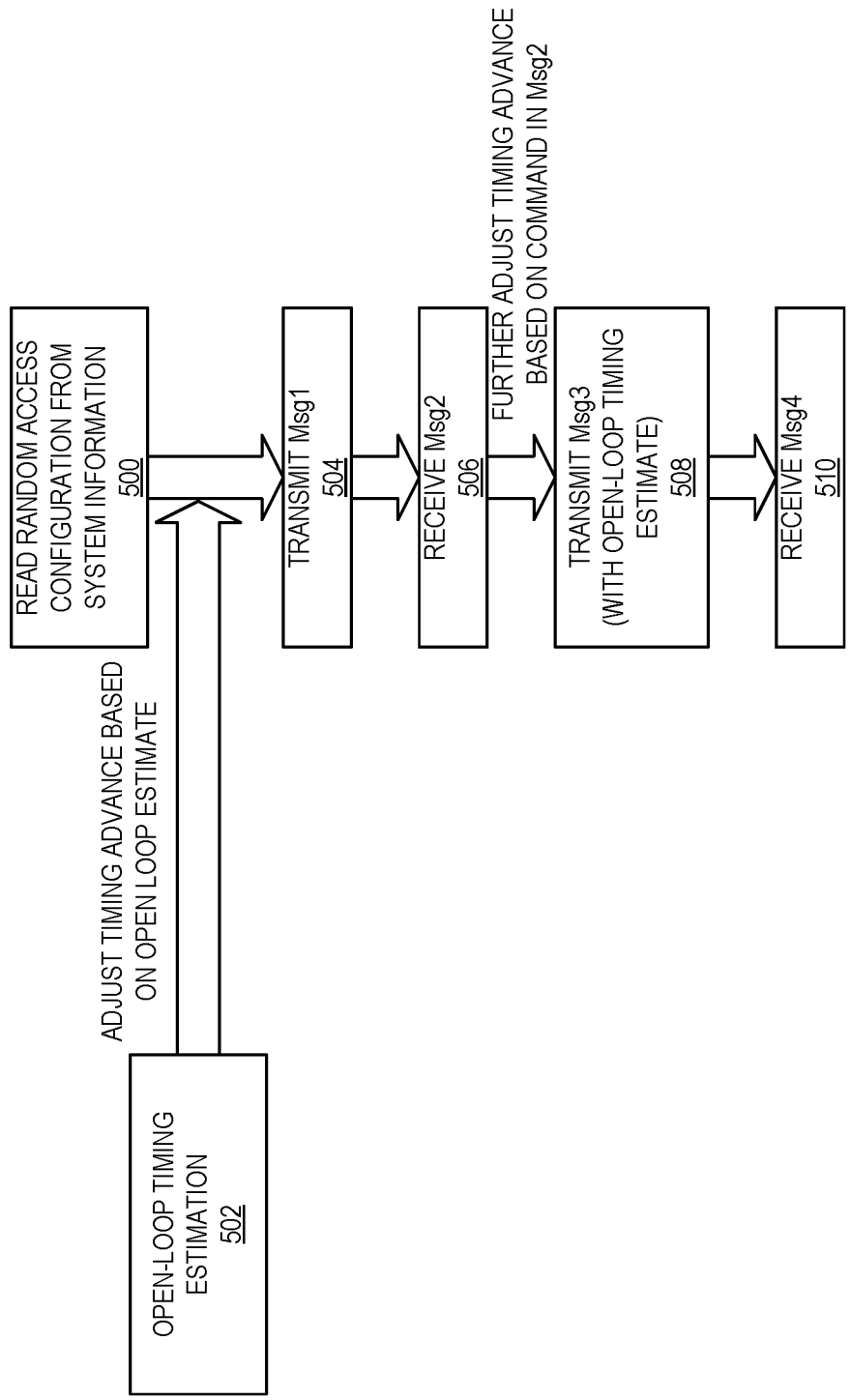
FIG. 5 illustrates a flow chart of a random access procedure from the perspective of a User Equipment (UE) in accordance with a first embodiment of the present disclosure.

FIG. 5 illustrates a flow chart of the random access procedure from the UE perspective. As illustrated, the UE reads a random access configuration from system information (step 500). The UE also performs open-loop timing estimation and adjusts its TA based on the resulting open loop-timing estimate (step 502). The UE transmits a random access preamble (i.e., Msg1) in accordance with the random access configuration, using the adjusted TA (which is based on the open-loop timing estimate) (step 504). The UE subsequently receives a random access response (i.e., Msg2) from the radio access network and further adjusts it TA based on the closed-loop timing adjustment command received in Msg2 (step 506). The UE then transmits Msg3 (step 508). In Embodiment 1, the UE includes its open-loop timing estimate in Msg3. In scenarios where contention resolution is performed, the UE receives Msg4 (step 510).

Figure 6:
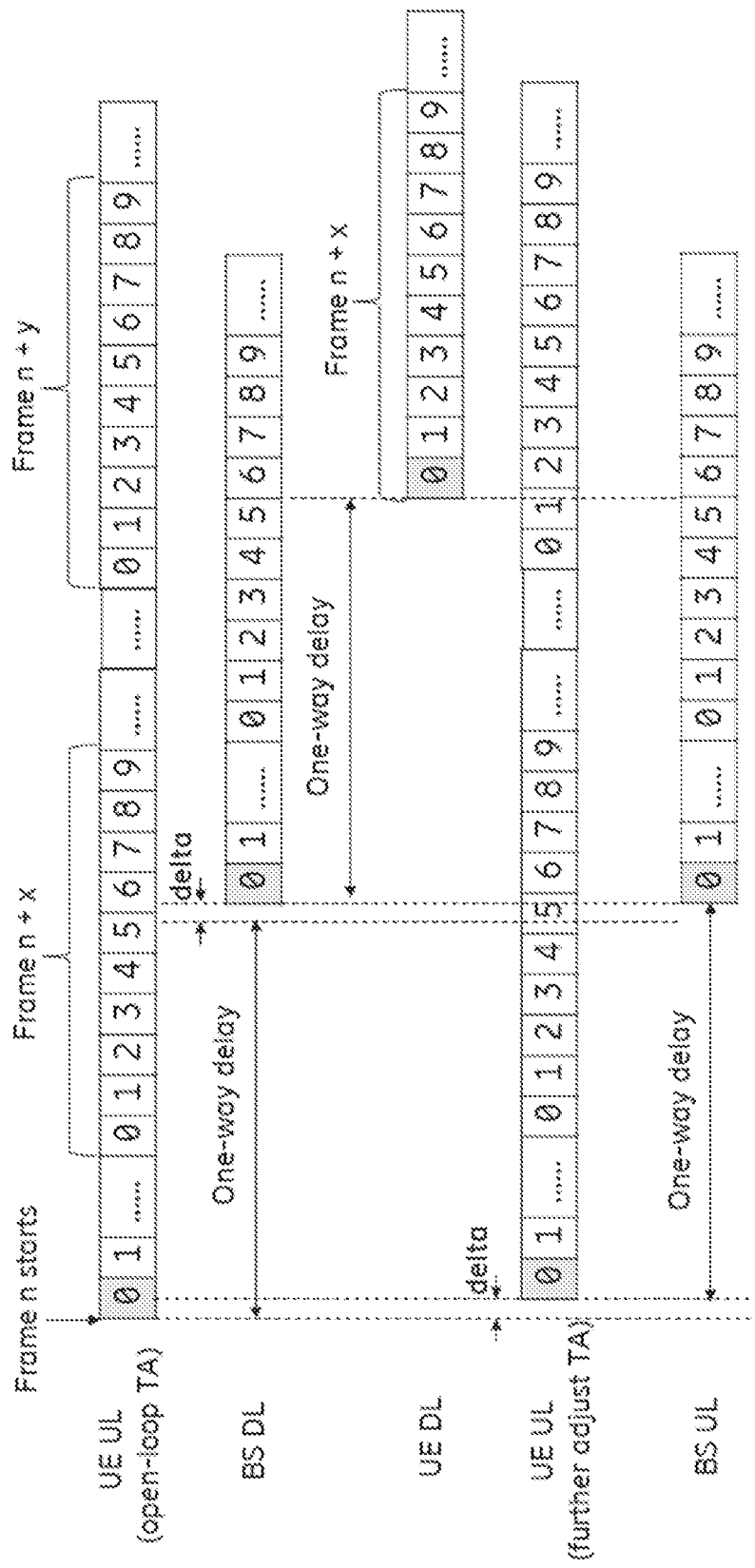
FIG. 6 further illustrates an example of how the UE adjusts its uplink timing first based on an open-loop estimate and later fine tunes its uplink timing based on the command from the base station in accordance with the first embodiment of the present disclosure.

FIG. 6 further illustrates how the UE adjusts its uplink timing first based on an open-loop estimate and later fine tunes its uplink timing based on the command from the BS. In particular, FIG. 6 illustrates timing relationships for Embodiments 1 and 2.

Next, a few non-limiting examples are given to describe how some of the steps may be implemented:

Open-loop TA estimate (applicable to all embodiments):
In one example, the UE uses Global Positioning System (GPS) information regarding the UE (i.e., terminal) position and satellite ephemeris data. In another example, the system frame timing may be pre-specified so that the start time of each system frame is known to the UE. For example, it may be specified that the start time of system frame 0 is every T seconds (e.g., T=10 seconds) starting from a certain date and time, for instance starting from 2019-01-01 00:00:00. The UE can estimate its one way delay to a BS by comparing the time a downlink system subframe is received at the UE and the expected start time of the system frame. In another example, one-way propagation delay is derived when the network broadcasts a fine granularity GPS time (without TA compensation and with a granularity of 1 microsecond (μs)) as introduced in System Information Block 16 (SIB-16) in LTE Release 15 and by comparing the received GPS time from the network and the UE's knowledge of the actual GPS time from GPS information.

A separate PRACH resource (in time, frequency, space, and/or code) may be configured for the UE to transmit Msg1 in this random access process.

Random Access Radio Network Temporary Identifier (RA-RNTI) used for Msg2 Physical Downlink Control Channel (PDCCH) scrambling is set according to time after applying the TA at the UE A new range for TA command in Msg2 may be defined.
Example 1: Shift the existing unipolar TA range [0, Tmax] to a bipolar TA range [−Tmax/2, Tmax/2]. The same number of TA bits can be used. In this example, it is assumed that a UE is able to estimate its open-loop TA at least within a fraction of Tmax/2.
Example 2: Define a new TA range [−T1, T2] where T1 and T2 are positive values, and choose the number of TA bits accordingly.

Timing reporting in Msg3
Example 1: The UE reports the absolute open-loop timing estimate, either in units of a fraction of a slot or in a slot or both.
Example 2: The UE reports the differential value that equals the absolute open-loop timing estimate minus a reference timing value.
The reference timing value may be broadcast in SI.
Different reference timing value ranges may be defined for different satellite deployments (for example LEO, Medium Earth Orbit (MEO), and GEO can have different reference timing value ranges).
The BS may choose the reference timing based on, for example:
a point in a cell footprint or an Synchronization Signal (SS)/Physical Broadcast Channel Block (SSB) beam footprint on the Earth's surface that has the shortest or longest propagation delay, or the center of a cell footprint or an SSB beam footprint on the Earth's surface.
In some embodiments, the reference timing value is chosen equal to the common delay component associated with a spotbeam.

Scheduling of Msg3
The BS may schedule Msg3 based on the largest propagation delay in a cell footprint or an SSB beam footprint on the Earth's surface, if the BS does not know the UE's propagation delay already.

Key SI (applicable to all embodiments)
As mentioned above, the reference timing value may be broadcast in SI, for example in SIB2.

A reference timing value may be broadcast per cell; or

A reference timing value may be broadcast per SSB beam.

Two options to indicate to the UE whether the UE reports absolute open loop timing estimate (Example 1) or differential value (Example 2) are as follows.

Option 1: If the reference timing value is present in SI, the UE reports according to Example 2 and, if the reference value is not present in SI, the UE reports according to Example 1.

Option 2: In addition to the reference value being present in SI, there may be a bit indicating to the UE whether absolute or differential timing reporting should be applied.

Figure 7:
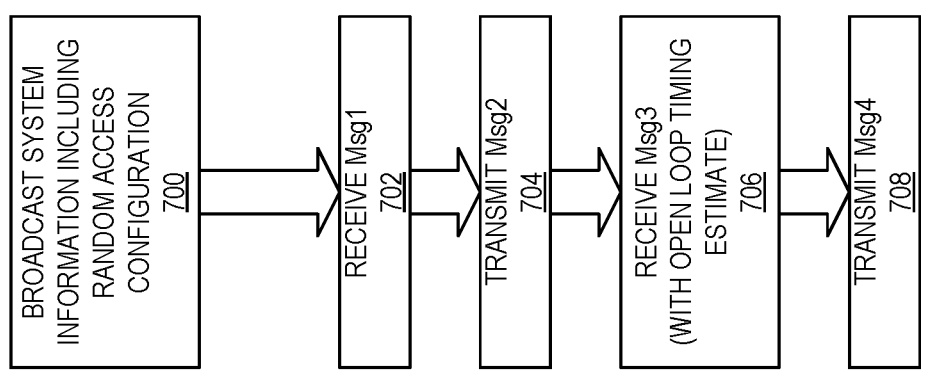
FIG. 7 is a flow chart that illustrates a random access procedure from the perspective of a base station in accordance with the first embodiment of the present disclosure.

FIG. 7 is a flow chart that illustrates the random access procedure of Embodiment 1 from the BS perspective. As illustrated, the BS broadcasts SI including a random access configuration (step 700). The BS receives Msg1 from the UE (step 702). As discussed above, the UE performs open-loop timing estimation uses the resulting open-loop timing estimate to transmit Msg1. The BS detects Msg1 and transmits Msg2, where Msg2 includes a closed-loop timing adjustment command (step 704). The BS then receives Msg3 from the UE (step 706). In Embodiment 1, Msg3 includes information that indicates the open-loop timing estimate of the UE. In scenarios where contention resolution is performed, the BS transmits Msg4 (step 708).

Embodiment 2

A UE performs an open-loop TA estimate. The UE applies TA using the open-loop timing estimate before sending Msg1. Msg1 carries the information on the UE open-loop timing estimate. This is achieved by further dividing each current group of PRACH resources into subgroups, with each subgroup corresponding to a timing range. The UE selects the PRACH preamble from the subgroup that corresponds to its open-loop timing estimate and transmits Msg1. The BS sends back a closed-loop timing adjustment command in Msg2. The UE adjusts its TA based on the command in Msg2 before sending Msg3.

Figure 8:
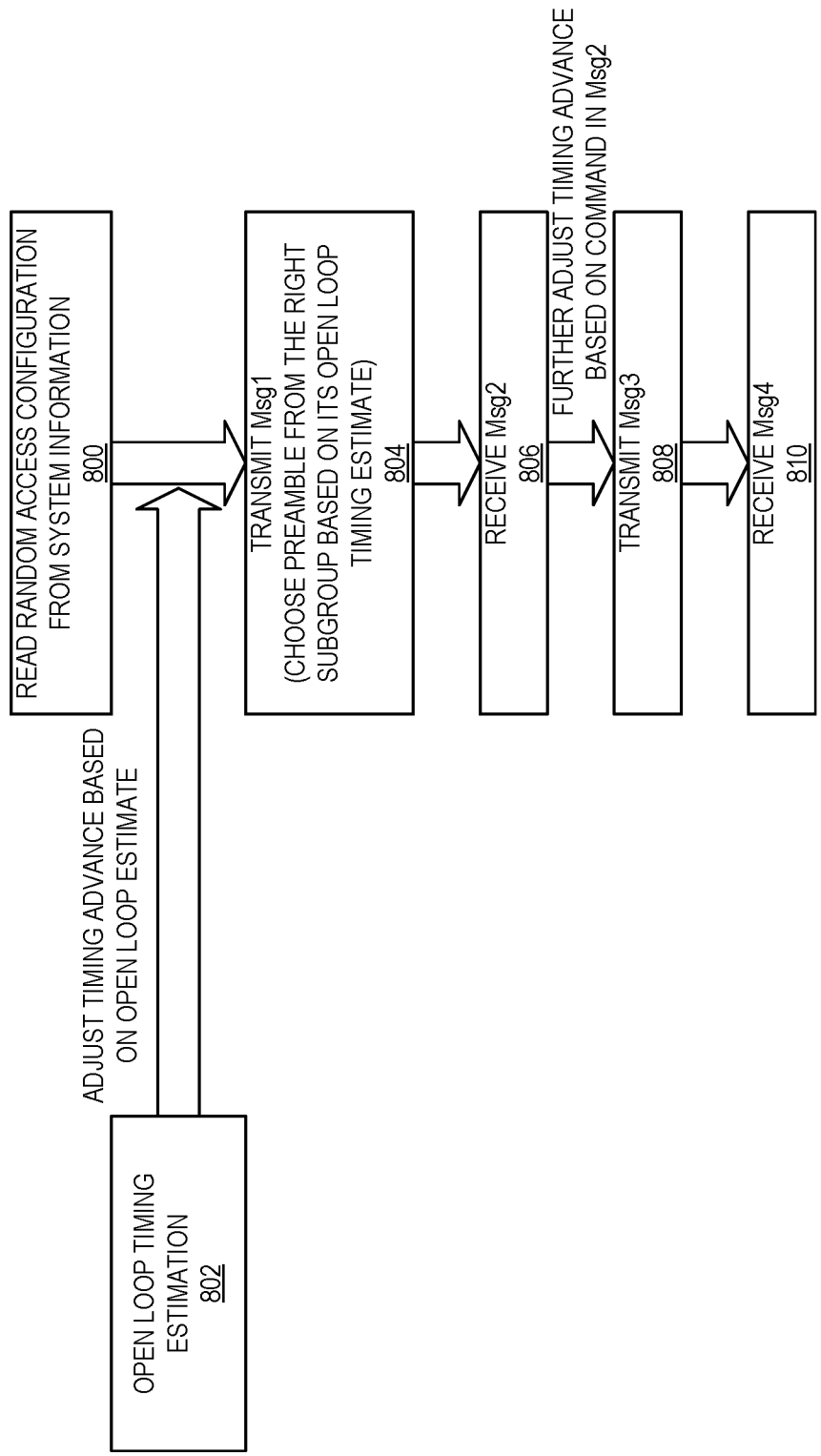
FIG. 8 illustrates a flow chart of a random access procedure from the perspective of a UE in accordance with a second embodiment of the present disclosure.

Compared to Embodiment 1 where the UE's open-loop timing estimate information is carried in Msg3, Embodiment 2 allows the UE to indicate its open-loop timing estimate information in Msg1. FIG. 8 illustrates a flow chart of a random access procedure from the UE perspective. How the UE adjusts its uplink timing first based on an open-loop estimate and later tunes it based on the command from the BS is similar to in Embodiment 1, as illustrated in FIG. 5. As illustrated in FIG. 8, the UE reads a random access configuration from SI (step 800). The UE also performs open-loop timing estimation and adjusts its TA based on the resulting open-loop timing estimate (step 802). The UE selects a random access preamble based on the open-loop timing estimate, and transmits the random access preamble (i.e., Msg1) in accordance with the random access configuration, using the adjusted TA (which is based on the open-loop timing estimate) (step 804). As discussed above, the UE selects the random access preamble from a subgroup of PRACH resources that corresponding to a timing range in which its open-loop timing estimate falls. The UE subsequently receives a Random Access Response (RAR) (i.e., Msg2) from the radio access network and further adjusts its TA based on the closed-loop timing adjustment command received in Msg2 (step 806). The UE then transmits Msg3 (step 808). In scenarios where contention resolution is performed, the UE receives Msg4 (step 810).

Next, a few non-limiting examples are given to describe how some of the steps may be implemented.

A separate PRACH resource (in time, frequency, space, and/or code) may be configured for the UE to transmit Msg1 in this random access process.

Each group of the PRACH resource is divided into N configurable groups: group 0, . . . , N−1. Group i is used for the UE with the open-loop timing estimate belonging to the i-th group.

Example 1: The BS configures N+1 break time points $T_0, T_1, \ldots, T_N$. Group i is used for the UE with the open-loop timing estimate in the range $[T_i, T_{i+1})$.

Example 1a: The UE selects the group based on the differential value that equals the absolute open-loop timing estimate minus a reference timing value broadcast in SI. Group i is used for the UE with the differential timing value in the range $[T_i, T_{i+1})$.

Example 2: The BS configures $T_{min}$ and step size $\Delta$. Group i is used for the UE with open-loop timing estimate in the range $[T_{min}+(i-1)*\Delta, T_{min}+i*\Delta)$, for $i=1, \ldots, N-1$, and $[T_{min}+N*\Delta, +\infty)$ for $i=N$.

Example 2a: The UE selects the group based on the differential value that equals the absolute open-loop timing estimate minus a reference timing value broadcast in SI. Group i is used for the UE with the differential timing value in the range $[T_{min}+(i-1)*\Delta, T_{min}+i*\Delta)$, for $i=1, \ldots, N-1$, and $[T_{min}+N*\Delta, +\infty)$ for $i=N$.

Example 2a-1: $T_{min}$ can be fixed to 0, and $\Delta$ can be fixed to 1 ms in the specification. The BS configures N. For example, for a spotbeam with a maximum differential delay of 15.5 ms, the BS configures N=16, and PRACH group i is used for the UE with the differential timing value in the range $[i-1, i)$ ms for $i=1, \ldots, 15$, and $[15, +\infty)$ for $i=16$.

A new range for TA command in Msg2 may be defined

Example 1: Shift the existing unipolar TA range [0, Tmax] to a bipolar TA range [−Tmax/2, Tmax/2]. The same number of TA bits can be used.

Example 2: Define a new TA range [−T1, T2] where T1 and T2 are positive values, and choose the number of TA bits and the mapping of a bit string to a TA value accordingly.

Note that the description up until now assumes the open-loop timing is communicated from the UE to the BS in Msg3 in Embodiment 1 and in Msg1 in Embodiment 2. A combination of Embodiments 1 and 2 is possible: part of the open-loop timing information is indicated in Msg1 and the rest in Msg3. For example, the most significant bits of the timing information may be conveyed in Msg1, while the rest of the bits may be conveyed in Msg3.

Figure 9:
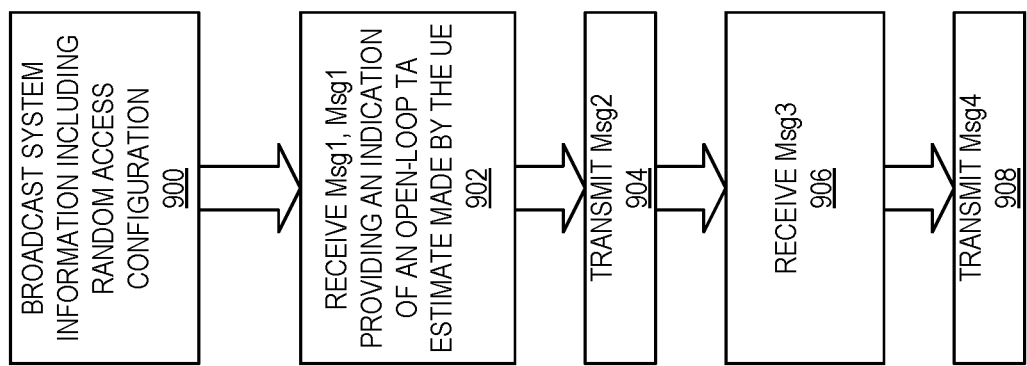
FIG. 9 is a flow chart that illustrates a random access procedure from the perspective of a base station in accordance with the second embodiment of the present disclosure.

FIG. 9 is a flow chart that illustrates the random access procedure of Embodiment 2 from the BS perspective. As illustrated, the BS broadcasts SI including a random access configuration (step 900). The BS receives Msg1 from the UE (step 902). As discussed above, the UE performs open-loop timing estimation and uses the resulting open-loop timing estimate to transmit Msg1. Further, Msg1 provides an indication of the open-loop timing estimate (e.g., the transmitted preamble is from a subgroup of preambles for a defined range of open-loop timing estimates). The BS detects Msg1 and transmits Msg2, where Msg2 includes a closed-loop timing adjustment command (step 904). The BS then receives Msg3 from the UE (step 906). In scenarios where contention resolution is performed, the BS transmits Msg4 (step 908).

Embodiment 3

A UE is not required to perform an open-loop TA estimate. Though the PRACH preambles have not been designed to handle long propagation delays and large differential delays, the BS can use implementation-based solutions to estimate the long propagation delays and/or large differential delays. In this case, the random access procedure can be kept close to the existing ones, except in Msg2 the BS sends back a large TA command.

Figure 10:
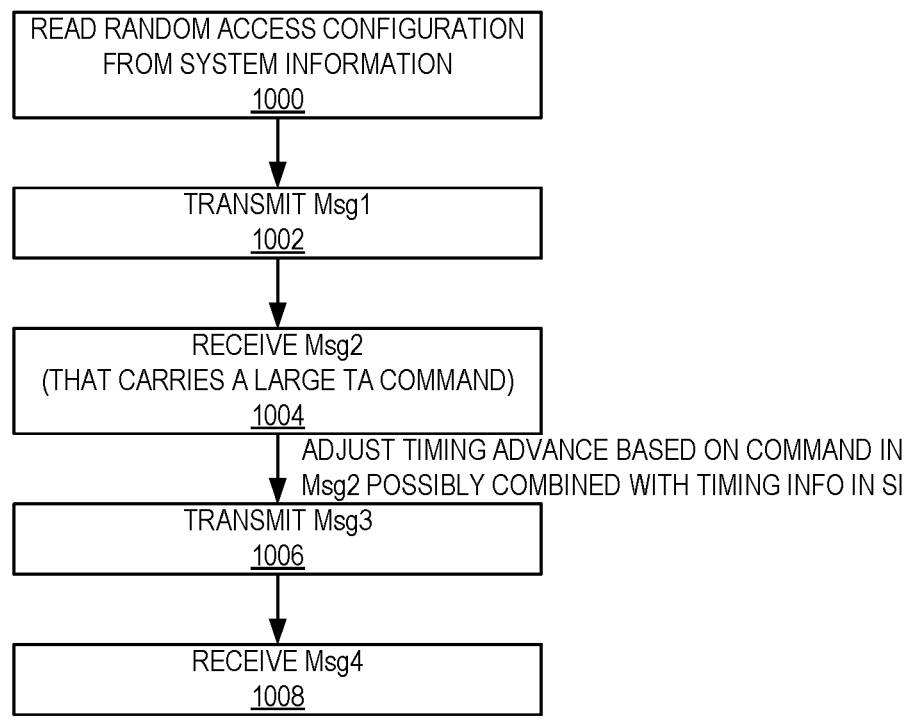
FIG. 10 illustrates a flow chart of a random access procedure from the perspective of a UE in accordance with a third embodiment of the present disclosure.
Figure 11:
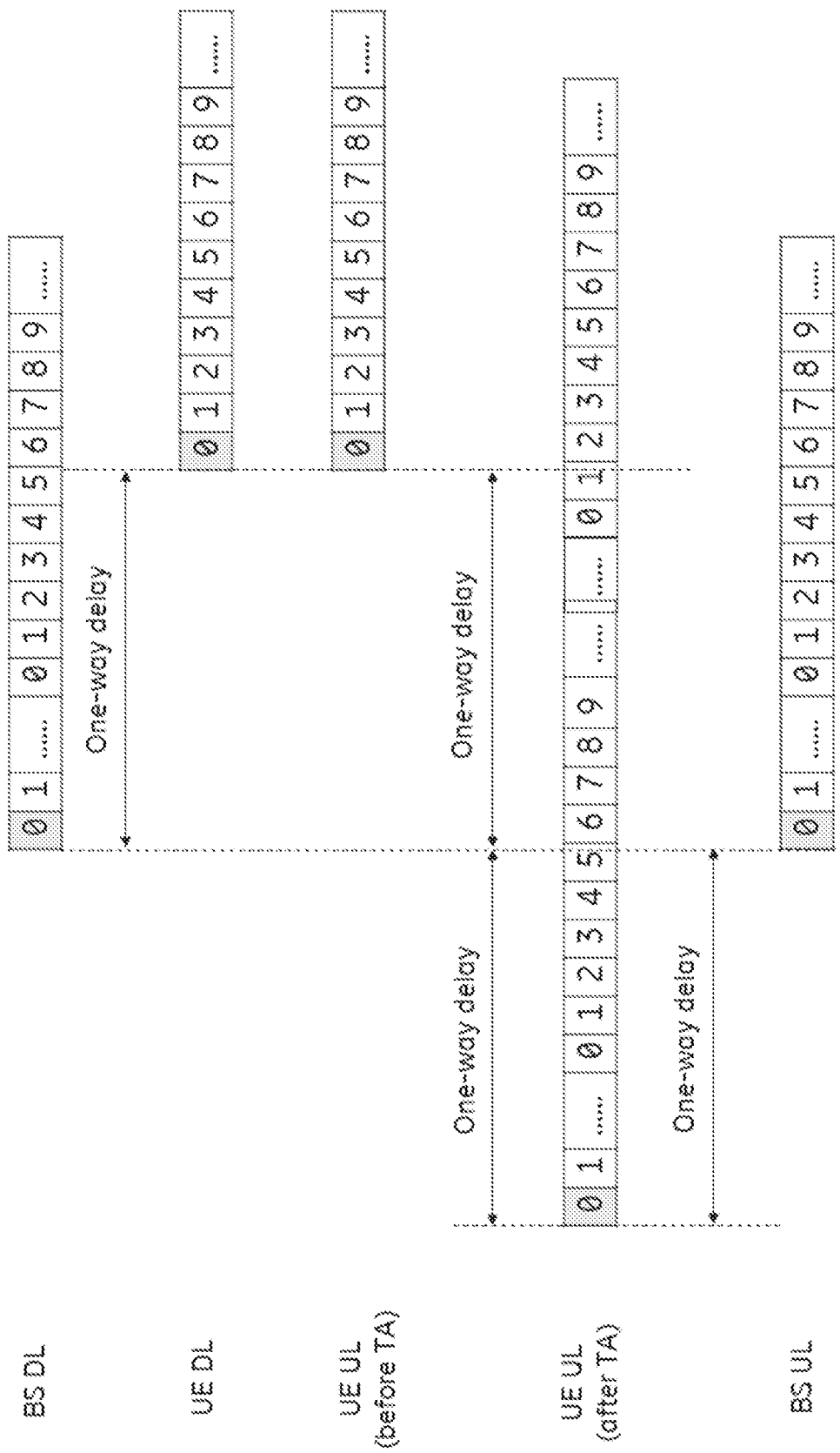
FIG. 11 further illustrates an example of how the UE adjusts its uplink timing based on the command from the base station in accordance with the third embodiment of the present disclosure.

FIG. 10 illustrates a flow chart of a random access procedure from the UE perspective. As illustrated, the UE reads a random access configuration from SI (step 1000). The UE transmits a random access preamble (i.e., Msg1) in accordance with the random access configuration (step 1002). The UE subsequently receives a RAR (i.e., Msg2) from the radio access network and further adjusts its TA based on the closed-loop timing adjustment command received in Msg2 (step 1004). In this embodiment, the TA command is indicative of a large TA value (i.e., a TA value that is larger than previously allowed in the TA command, in order to accommodate the long propagation delays and large differential delays in a satellite-based radio access network). The UE then transmits Msg3 (step 1006). In scenarios where contention resolution is performed, the UE receives Msg4 (step 1008). FIG. 11 further illustrates how the UE adjusts its uplink timing based on the command from the BS.

Next, a few non-limiting examples are given to describe how the steps could be implemented:

A separate PRACH resource (in time, frequency, space, and/or code) may be configured for the UE to transmit Msg1 in this random access process.

A new range for TA command in Msg2 may be defined.
Example 1: Extend the TA range [0, Tmax] such that Tmax can cover the largest TA value envisioned in the deployment. The number of bits for the TA command and the mapping of a bit string to a TA value are defined accordingly. For example, Tmax may be a value greater than 2 ms, a value greater than 10 ms, a value greater than 50 ms, or a value greater than 100 ms, depending on the particular implementation.
Example 2: The BS configures $T_{min}$ and $T_{max}$ depending on the deployment (LEO, MEO, or GEO) and/or cell size and/or beam size. The number of bits for the TA command and the mapping of a bit string to a TA value are defined accordingly.
Example 3: The BS configures $T_{min}$ or $T_{min}$ is fixed to be zero. TA resolution $\Delta$ can be the same as the existing supported value or a newly fixed one or a configurable one. The number of TA bits is denoted as M, which can be fixed or configurable. Then the TA range supported is $T_{min}, T_{min}+\Delta, \ldots, T_{min}+(2^M-1)*\Delta$.

UE TA procedure
The large TA carried in Msg2 may be used in the following ways:
Example 1: The UE applies TA according to the command in Msg2.
Example 2: The UE combines TA in Msg2 and the reference timing broadcast in SI to form an aggregate TA, and performs TA using the aggregate TA value.

The selection of Examples 1 and 2 above may be configured by the BS

Figure 12:
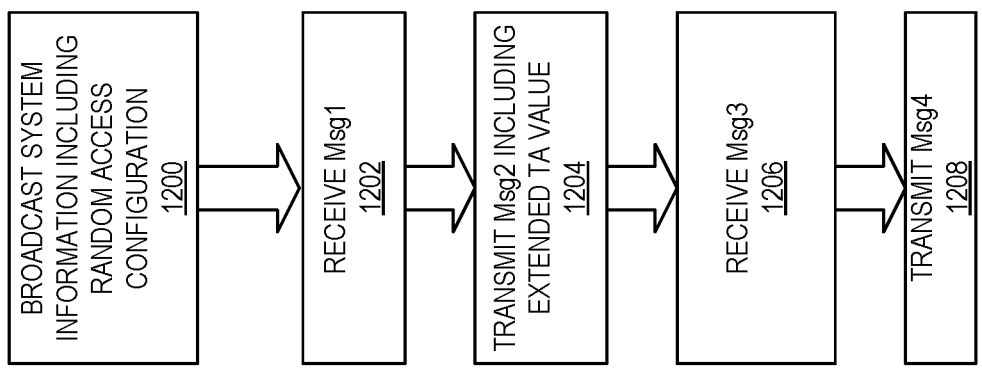
FIG. 12 is a flow chart that illustrates a random access procedure from the perspective of a base station in accordance with the third embodiment of the present disclosure.

FIG. 12 is a flow chart that illustrates the random access procedure of Embodiment 3 from the BS perspective. As illustrated, the BS broadcasts SI including a random access configuration (step 1200). The BS receives Msg1 from the UE (step 1202). The BS detects Msg1 and transmits Msg2, where Msg2 includes a timing adjustment command including an extended TA value, as discussed above (step 1204). The BS then receives Msg3 from the UE (step 1206). In scenarios where contention resolution is performed, the BS transmits Msg4 (step 1208).

Embodiment 3a

Figure 13:
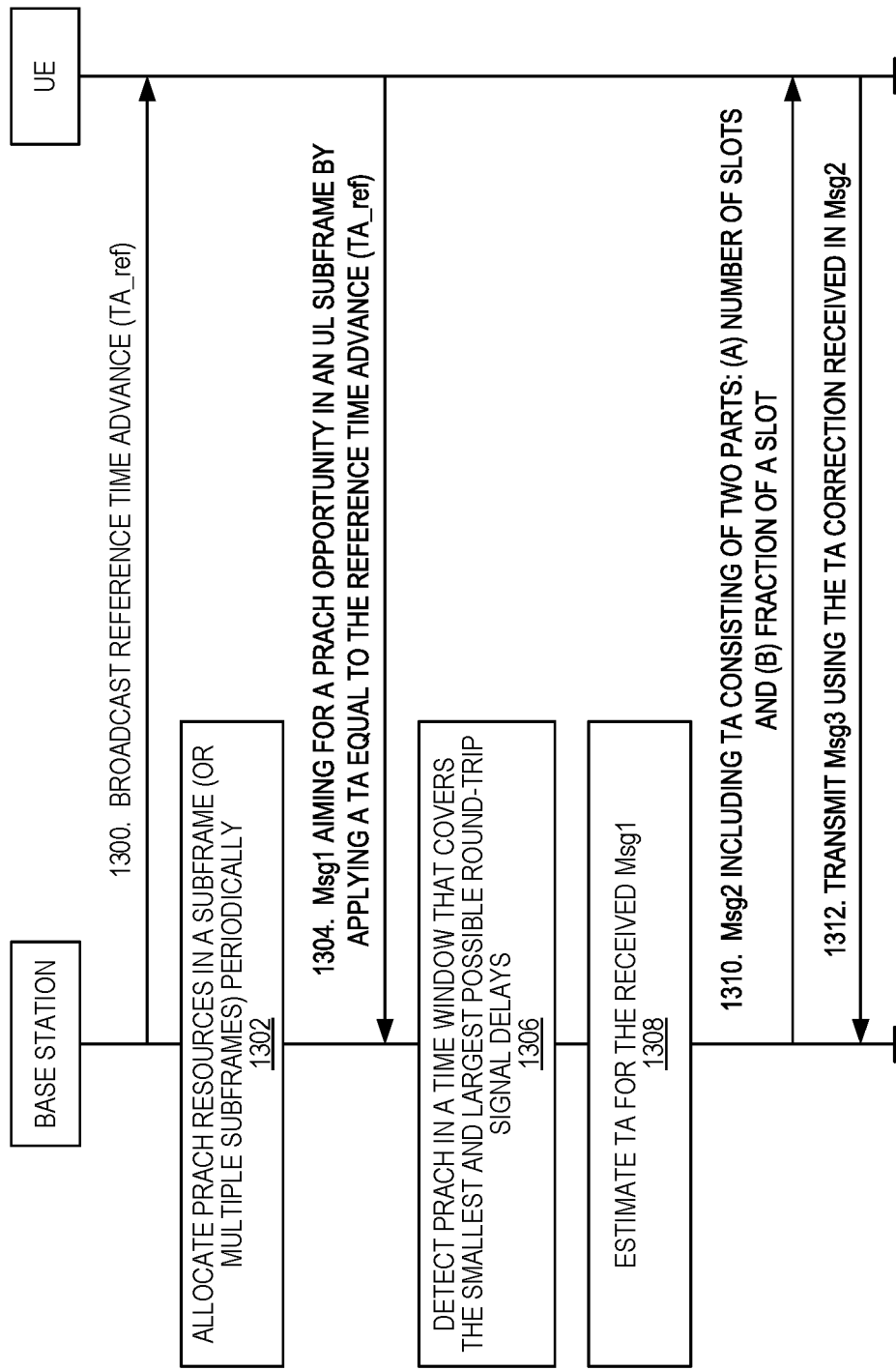
FIG. 13 illustrates the operation of a UE and a base station in accordance with another embodiment of the present disclosure.

In an alternative option, the BS may broadcast a reference round-trip delay to UEs based on the largest (or smallest) round-trip signal delay, TA_ref, in the service area. A UE applies a TA equal to TA_ref in sending the PRACH in a PRACH resource to the BS. As illustrated in FIG. 13, the procedure could include the following steps:

Step 1300: The BS broadcasts a reference TA, TA_ref, based on the largest (or the smallest) possible round-trip signal delay in the service area.
Step 1302: The BS allocates PRACH resources in a subframe (or multiple subframes) periodically.
Step 1304: A UE transmits Msg1 aiming for a PRACH opportunity in an uplink subframe by applying a TA equal to the broadcast reference time delay, TA_ref.
Step 1306: The BS detects PRACH in a time window that covers the smallest and the largest possible round-trip signal delays. This may mean a time window over multiple subframes, where the last (or the first) subframe is the subframe all UEs are aiming for in case of single subframe PRACH resource configuration.
Step 1308: After a PRACH is detected, the BS estimates the TA for the received Msg1 using the start of the last (or the first) subframe in the detection window as timing reference.
Step 1310: The BS sends a TA in Msg2 consisting of two parts, i.e. (a) a number of slots, and (b) a fraction of a slot. For a UE whose actual round-trip delay is the same as or very close to the broadcast reference round-trip delay, the value of part (a) should be zero, i.e. the TA is only a fraction of a slot. In Msg2, a PRACH Identifier (ID) is also included to indicate the PRACH preamble and the subframe over which the PRACH is received. A PRACH of a UE aiming for a subframe may actually be received in a different subframe due to the difference between the actual round-trip delay and the broadcast reference round trip delay. One solution may be to use the last subframe (or the first) in the detection window as the receive subframe when forming the PRACH ID, i.e. using the subframe configured for PRACH in the detection window to form the PRACH ID.
Step 1312: After receiving Msg2 and the PRACH ID matches the UE's transmitted PRACH, a UE sends Msg3 by applying an additional TA correction received in Msg2 and a subframe offset either predetermined or signaled in Msg2.

By broadcasting a reference round-trip delay to UEs based on the largest (or smallest) round-trip signal delay, TA_ref, in the service area and a UE applies a TA equal to TA_ref, the BS would know the actual round-trip delay of the UE after receiving Msg1. It is possible to align uplink signals such as Physical Uplink Shared Channel (PUSCH), Physical Uplink Control Channel (PUCCH) from UEs with different round-trip delays in the same uplink subframe.

Embodiment 4

The UE is not required to perform open-loop TA estimate. Though the PRACH preambles have not been designed to handle long propagation delay and large differential delay, the BS can use implementation-based solutions to estimate the long propagation delay and/or large differential delay. In this case, the random access procedure can be kept close to the existing ones and in Msg2 the BS sends back a TA command only to align subframe boundary.

Figure 14:
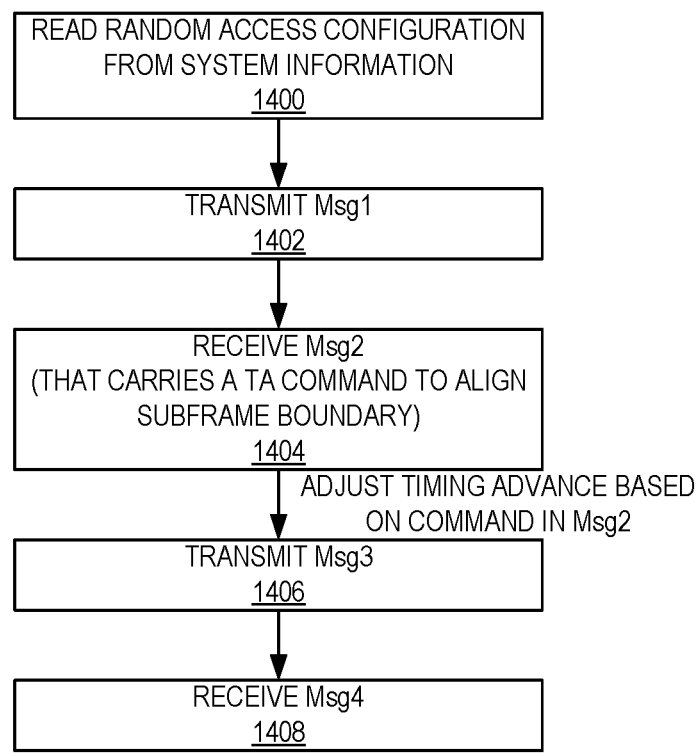
FIG. 14 illustrates a flow chart of a random access procedure from the perspective of a UE in accordance with a fourth embodiment of the present disclosure.
Figure 15:
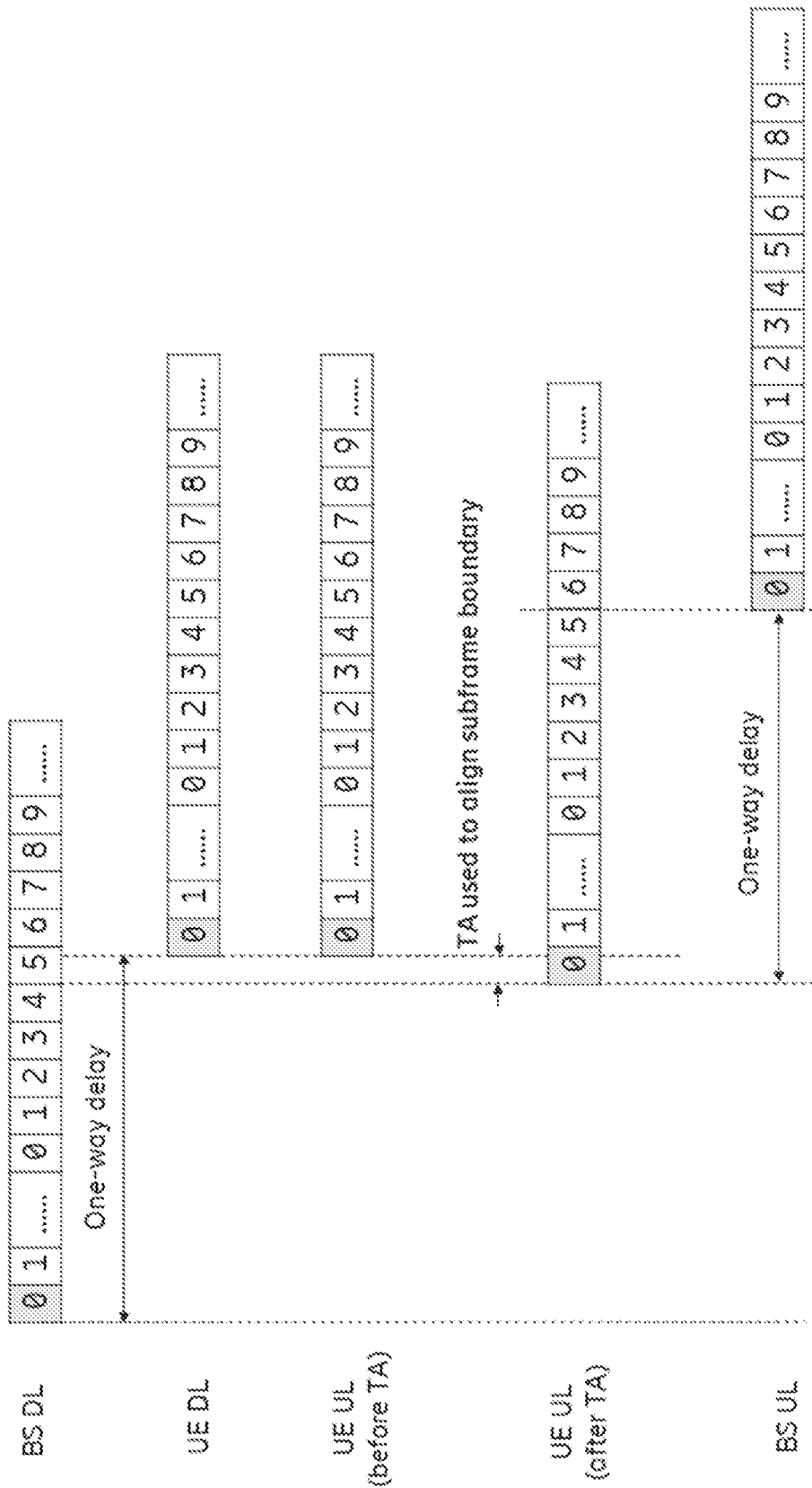
FIG. 15 further illustrates an example of how the UE adjusts its uplink timing based on the command from the base station in accordance with the fourth embodiment of the present disclosure.

FIG. 14 illustrates a flow chart of the random access procedure from the UE perspective. As illustrated, the UE reads a random access configuration from SI (step 1400). The UE transmits a random access preamble (i.e., Msg1) in accordance with the random access configuration (step 1402). The UE subsequently receives a random access response (i.e., Msg2) from the radio access network and further adjusts its TA based on the closed-loop timing adjustment command received in Msg2 (step 1404). In this embodiment, the TA command includes a TA command to align the subframe boundary. The UE then transmits Msg3 (step 1406). In scenarios where contention resolution is performed, the UE receives Msg4 (step 1408). FIG. 15 further illustrates how the UE adjusts its uplink timing based on the command from the BS.

Next, a few non-limiting examples are given to describe how the steps may be implemented:
  TA for subframe alignment
    Example 1: timing adjust with bipolar TA values with range [−0.5 ms, 0.5 ms]
      The BS can command the UE to advance (with a positive TA value) or delay (with a negative TA value) uplink timing to align to the subframe boundary.
    Example 2: timing adjust with unipolar TA values with range [0 ms, 1 ms]
      The BS can command the UE to advance uplink timing to align to the subframe boundary.
  Estimation and communication of propagation delay (some procedures below do not have to be part of the random access procedure)
    Though not required, the UE may perform an estimate of propagation delay and/or differential delay.
      The UE may indicate to the BS about its capability of such estimates.
      The UE may be triggered to perform these estimates.
      The BS may poll the UE to report the estimates from the UE to the BS.
    Alternatively, the BS can use implementation-based solutions to estimate the propagation delay and/or differential delay.
      The BS may provide the UE with the estimates to assist with UE behaviors.

Figure 16:
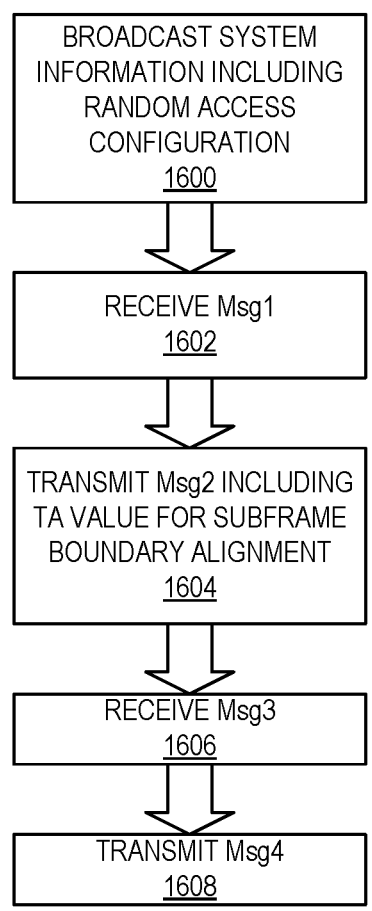
FIG. 16 is a flow chart that illustrates a random access procedure from the perspective of a base station in accordance with the fourth embodiment of the present disclosure.

FIG. 16 is a flow chart that illustrates the random access procedure of Embodiment 4 from the BS perspective. As illustrated, the BS broadcasts SI including a random access configuration (step 1600). The BS receives Msg1 from the UE (step 1602). The BS detects Msg1 and transmits Msg2, where Msg2 includes a timing adjustment command including a TA value for subframe boundary alignment, as discussed above (step 1604). The BS then receives Msg3 from the UE (step 1606). In scenarios where contention resolution is performed, the BS transmits Msg4 (step 1608).

Embodiment 5

The UE is not required to do open-loop timing estimates nor is the BS required to do its own estimation. The procedure is designed in order to provide both the UE and BS (e.g., eNB) necessary information to accurately estimate the propagation delay. By dividing the PRACH preambles into different subframes, the network will ensure that two UEs with different delays will not collide with the same preambles.

Figure 17:
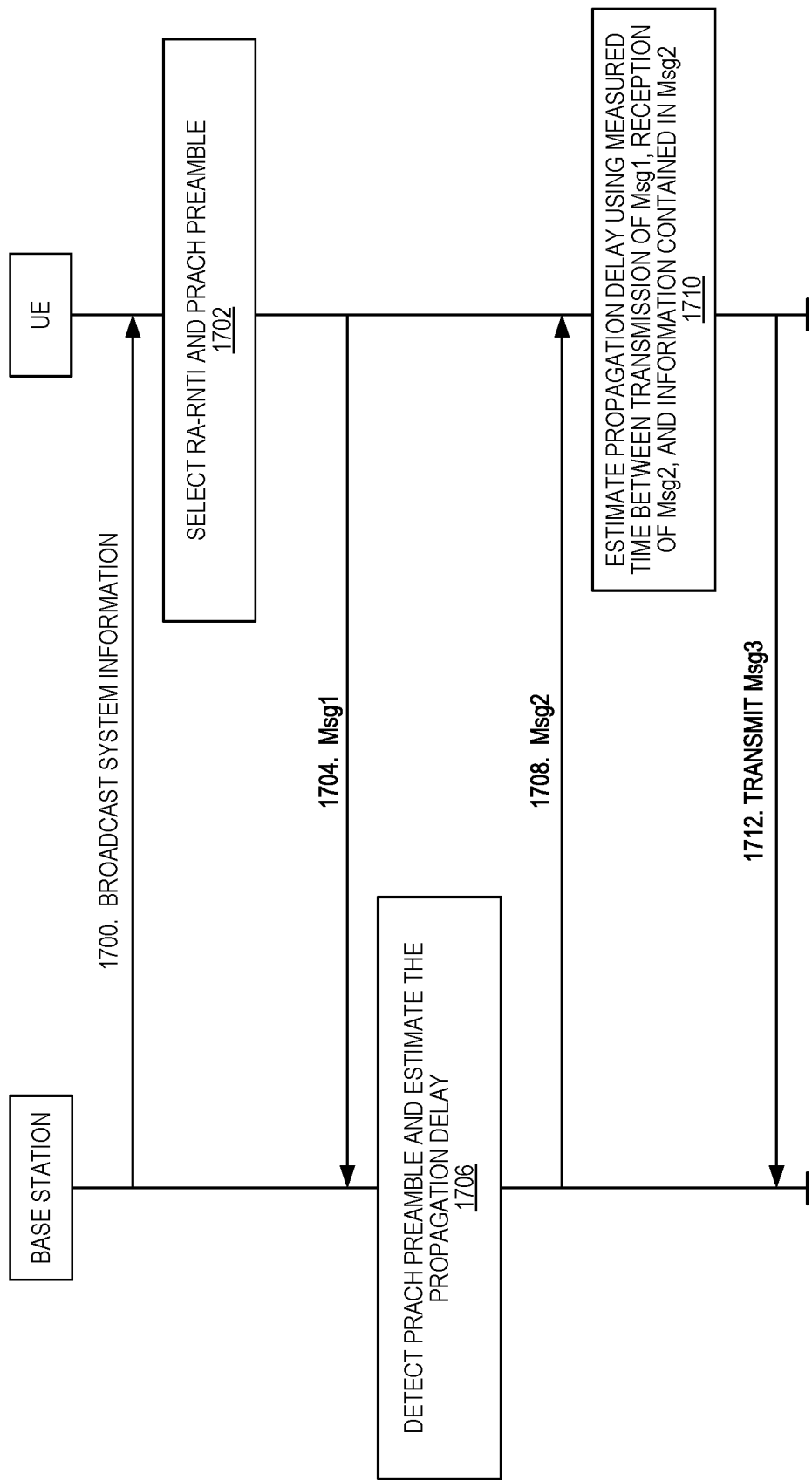
FIG. 17 illustrates the operation of a UE and a base station in accordance with one example of a fifth embodiment of the present disclosure.

Next, a set of non-limiting examples are provided below. This process is illustrated in FIG. 17:
  The PRACH preambles are divided in to N groups pg_1, pg_2, . . . , pg_N−1 where each group is assigned one subframe. This subframe pattern is then repeated every M subframes in which M≥N.
  N as an example should be the maximum differential delay.
  M as an example can also be set to the maximum differential delay.
  Step 1700: The BS provides the following configurations in SI:
    N,
    M, and
    minimum propagation delay of the spotbeam/cell as the reference timing value.
  Steps 1702 and 1704: The UE selects RA-RNTI and preamble, and transmits Msg1 in the corresponding subframe.
    The RA-RNTI is calculated as RA-RNTI=1+pg_id+M*f_id, where
      pg_id is the preamble group between 0 and M−1, and f_id is between 0 and 5.
  Step 1706: The reception of Msg1 from the UE allows the BS to estimate the propagation delay.
  Step 1708: The BS transmits Msg2 with the UEs selected RA-RNTI, and the UE waits for the Msg2 with its selected RA-RNTI, which contains the following:
    an extended TA=[−0.5, 0.5] ms, and
    the BS delay between reception of Msg1 and transmission of Msg2.
      This delay can for example be signaled as a four bit field, which would make the maximum delay 16 ms.
  Step 1710: The reception of Msg2 allows the UE to accurately estimate its propagation delay using the measured time between transmission of Msg1, reception of Msg2, and TA delay and BS delay in Msg2.
  Step 1712: The UE sends Msg3 applying the TA
    The UE may optionally include propagation delay in Msg3.
This can be used for contention resolution if the BS receives two Msg3 with the same RA-RNTI but with different signaled propagation delays.

Additional Aspects

Figure 18:
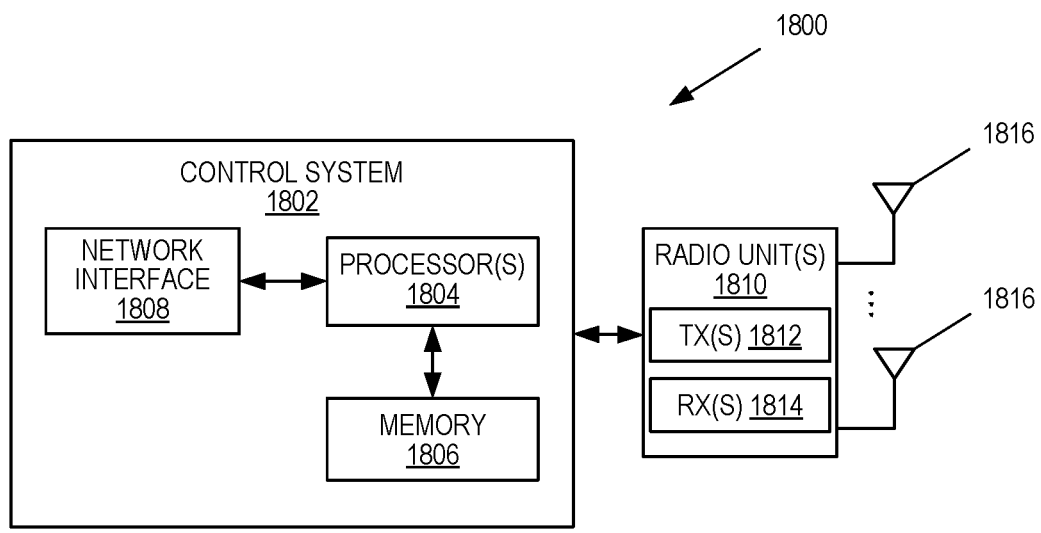
FIGS. 18 through 20 illustrate example embodiments of a radio access node (e.g., a base station)

FIG. 18 is a schematic block diagram of a radio access node 1800 (e.g., a BS) according to some embodiments of the present disclosure. The radio access node 1800 may be, for example, a satellite based radio access node. As illustrated, the radio access node 1800 includes a control system 1802 that includes one or more processors 1804 (e.g., Central Processing Units (CPUs), Application Specific Integrated Circuits (ASICs), Field Programmable Gate Arrays (FPGAs), and/or the like), memory 1806, and a network interface 1808. The one or more processors 1804 are also referred to herein as processing circuitry. In addition, the radio access node 1800 includes one or more radio units 1810 that each includes one or more transmitters 1812 and one or more receivers 1814 coupled to one or more antennas 1816. The radio units 1810 may be referred to or be part of radio interface circuitry. In some embodiments, the radio unit(s) 1810 is external to the control system 1802 and connected to the control system 1802 via, e.g., a wired connection (e.g., an optical cable). However, in some other embodiments, the radio unit(s) 1810 and potentially the antenna(s) 1816 are integrated together with the control system 1802. The one or more processors 1804 operate to provide one or more functions of a radio access node 1800 as described herein. In some embodiments, the function(s) are implemented in software that is stored, e.g., in the memory 1806 and executed by the one or more processors 1804.

In some embodiments, both the control system 1802 and the radio unit(s) 1810 are implemented in the satellite, e.g., of FIG. 1. As one example alternative, the radio unit(s) may be implemented in the satellite, e.g., of FIG. 1 and the control system 1802 may be implemented in a land-based component of the radio access node that is communicatively coupled to the satellite via the gateway, e.g., of FIG. 1.

Figure 19:
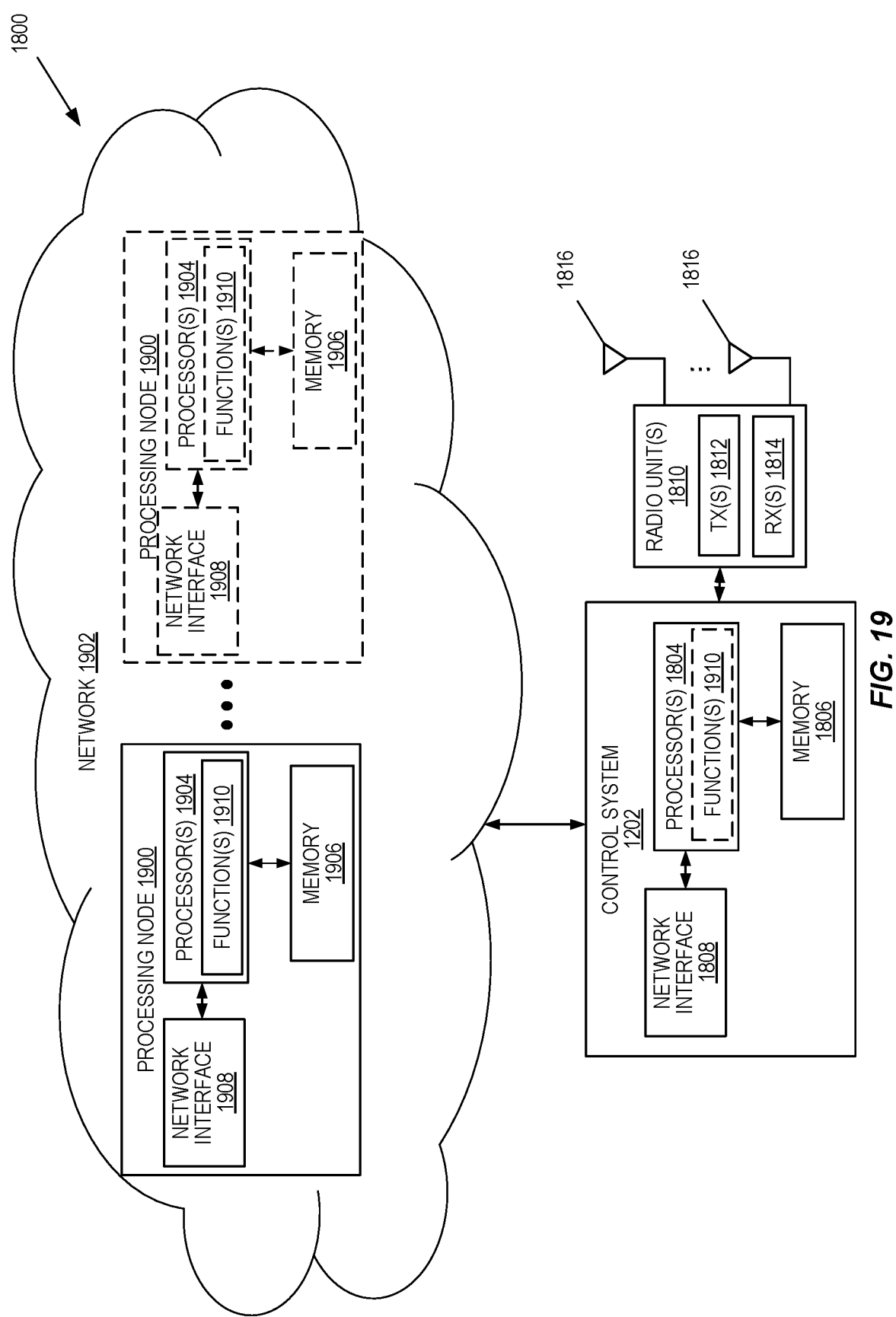

FIG. 19 is a schematic block diagram that illustrates a virtualized embodiment of the radio access node 1800 according to some embodiments of the present disclosure. This discussion is equally applicable to other types of network nodes. Further, other types of network nodes may have similar virtualized architectures.

As used herein, a "virtualized" radio access node is an implementation of the radio access node 1800 in which at least a portion of the functionality of the radio access node 1800 is implemented as a virtual component(s) (e.g., via a virtual machine(s) executing on a physical processing node(s) in a network(s)). As illustrated, in this example, the radio access node 1800 includes the control system 1802 that includes the one or more processors 1804 (e.g., CPUs, ASICs, FPGAs, and/or the like), the memory 1806, and the network interface 1808 and the one or more radio units 1810 that each includes the one or more transmitters 1812 and the one or more receivers 1814 coupled to the one or more antennas 1816, as described above. The control system 1802 is connected to the radio unit(s) 1810 via, for example, an optical cable or the like. The control system 1802 is connected to one or more processing nodes 1900 coupled to or included as part of a network(s) 1902 via the network interface 1808. Each processing node 1900 includes one or more processors 1904 (e.g., CPUs, ASICs, FPGAs, and/or the like), memory 1906, and a network interface 1908.

In this example, functions 1910 of the radio access node 1800 described herein are implemented at the one or more processing nodes 1900 or distributed across the control system 1802 and the one or more processing nodes 1900 in any desired manner. In some particular embodiments, some or all of the functions 1910 of the radio access node 1800 described herein are implemented as virtual components executed by one or more virtual machines implemented in a virtual environment(s) hosted by the processing node(s) 1900. As will be appreciated by one of ordinary skill in the art, additional signaling or communication between the processing node(s) 1900 and the control system 1802 is used in order to carry out at least some of the desired functions 1910. Notably, in some embodiments, the control system 1802 may not be included, in which case the radio unit(s) 1810 communicate directly with the processing node(s) 1900 via an appropriate network interface(s).

In some embodiments, a computer program including instructions which, when executed by at least one processor, causes the at least one processor to carry out the functionality of radio access node 1800 or a node (e.g., a processing node 1900) implementing one or more of the functions 1910 of the radio access node 1800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
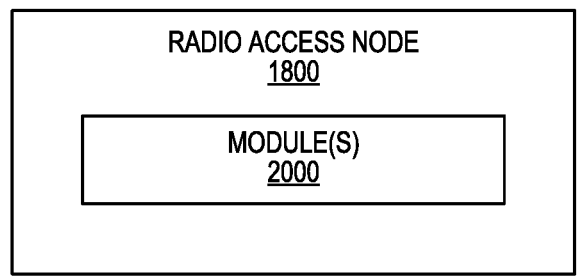

FIG. 20 is a schematic block diagram of the radio access node 1800 according to some other embodiments of the present disclosure. The radio access node 1800 includes one or more modules 2000, each of which is implemented in software. The module(s) 2000 provide the functionality of the radio access node 1800 described herein. This discussion is equally applicable to the processing node 1900 of FIG. 19 where the modules 2000 may be implemented at one of the processing nodes 1900 or distributed across multiple processing nodes 1900 and/or distributed across the processing node(s) 1900 and the control system 1802.

Figure 21:
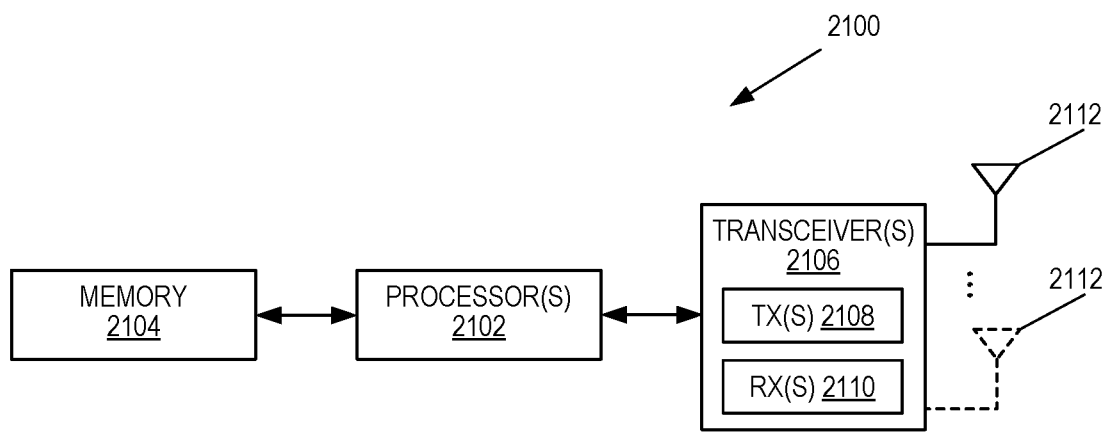
FIGS. 21 and 22 illustrate example embodiments of a UE.

FIG. 21 is a schematic block diagram of a UE 2100 according to some embodiments of the present disclosure. As illustrated, the UE 2100 includes one or more processors 2102 (e.g., CPUs, ASICs, FPGAs, and/or the like), memory 2104, and one or more transceivers 2106 each including one or more transmitters 2108 and one or more receivers 2110 coupled to one or more antennas 2112. The transceiver(s) 2106 includes radio-front end circuitry connected to the antenna(s) 2112 that is configured to condition signals communicated between the antenna(s) 2112 and the processor(s) 2102, as will be appreciated by on of ordinary skill in the art. The processors 2102 are also referred to herein as processing circuitry. The transceivers 2106 are also referred to herein as radio circuitry. In some embodiments, the functionality of the UE 2100 described above may be fully or partially implemented in software that is, e.g., stored in the memory 2104 and executed by the processor(s) 2102. Note that the UE 2100 may include additional components not illustrated in FIG. 21 such as, e.g., one or more user interface components (e.g., an input/output interface including a display, buttons, a touch screen, a microphone, a speaker(s), and/or the like and/or any other components for allowing input of information into the UE 2100 and/or allowing output of information from the UE 2100), a power supply (e.g., a battery and associated power circuitry), etc.

In some embodiments, a computer program including instructions which, when executed by at least one processor, causes the at least one processor to carry out the functionality of the UE 2100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 22:
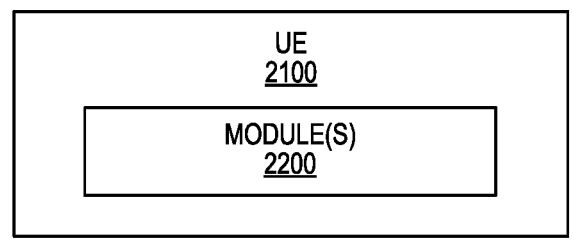

FIG. 22 is a schematic block diagram of the UE 2100 according to some other embodiments of the present disclosure. The UE 2100 includes one or more modules 2200, each of which is implemented in software. The module(s) 2200 provide the functionality of the UE 1500 described herein.

Figure 23:
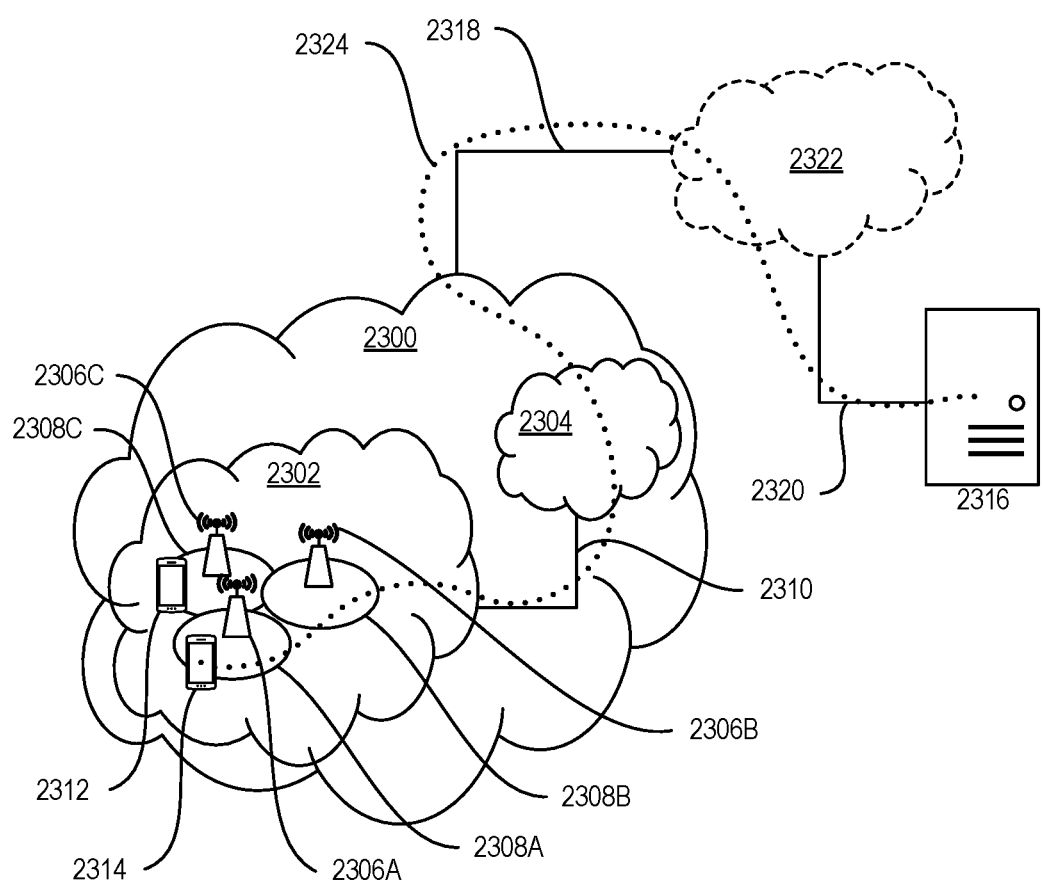
FIG. 23 illustrate an example of a communication system in which embodiments of the present disclosure may be implemented.

With reference to FIG. 23, in accordance with an embodiment, a communication system includes a telecommunication network 2300, such as a 3GPP-type cellular network, which comprises an access network 2302, such as a Radio Access Network (RAN), and a core network 2304. The access network 2302 comprises a plurality of base stations 2306A, 2306B, 2306C, such as Node Bs, eNBs, gNBs, or other types of wireless Access Points (APs), each defining a corresponding coverage area 2308A, 2308B, 2308C. Note that some or all of the APs, in some embodiments, satellite-based base stations as described herein. Each base station 2306A, 2306B, 2306C is connectable to the core network 2304 over a wired or wireless connection 2310. A first UE 2312 located in coverage area 2308C is configured to wirelessly connect to, or be paged by, the corresponding base station 2306C. A second UE 2314 in coverage area 2308A is wirelessly connectable to the corresponding base station 2306A. While a plurality of UEs 2312, 2314 are illustrated in this example, the disclosed embodiments are equally applicable to a situation where a sole UE is in the coverage area or where a sole UE is connecting to the corresponding base station 2306.

The telecommunication network 2300 is itself connected to a host computer 2316, which may be embodied in the hardware and/or software of a standalone server, a cloud-implemented server, a distributed server, or as processing resources in a server farm. The host computer 2316 may be under the ownership or control of a service provider, or may be operated by the service provider or on behalf of the service provider. Connections 2318 and 2320 between the telecommunication network 2300 and the host computer 2316 may extend directly from the core network 2304 to the host computer 2316 or may go via an optional intermediate network 2322. The intermediate network 2322 may be one of, or a combination of more than one of, a public, private, or hosted network; the intermediate network 2322, if any, may be a backbone network or the Internet; in particular, the intermediate network 2322 may comprise two or more sub-networks (not shown).

The communication system of FIG. 23 as a whole enables connectivity between the connected UEs 2312, 2314 and the host computer 2316. The connectivity may be described as an Over-the-Top (OTT) connection 2324. The host computer 2316 and the connected UEs 2312, 2314 are configured to communicate data and/or signaling via the OTT connection 2324, using the access network 2302, the core network 2304, any intermediate network 2322, and possible further infrastructure (not shown) as intermediaries. The OTT connection 2324 may be transparent in the sense that the participating communication devices through which the OTT connection 2324 passes are unaware of routing of uplink and downlink communications. For example, the base station 2306 may not or need not be informed about the past routing of an incoming downlink communication with data originating from the host computer 2316 to be forwarded (e.g., handed over) to a connected UE 2312. Similarly, the base station 2306 need not be aware of the future routing of an outgoing uplink communication originating from the UE 2312 towards the host computer 2316.

Example implementations, in accordance with an embodiment, of the UE, base station, and host computer discussed in the preceding paragraphs will now be described with reference to FIG. 24. In a communication system 2400, a host computer 2402 comprises hardware 2404 including a communication interface 2406 configured to set up and maintain a wired or wireless connection with an interface of a different communication device of the communication system 2400. The host computer 2402 further comprises processing circuitry 2408, which may have storage and/or processing capabilities. In particular, the processing circuitry 2408 may comprise one or more programmable processors, ASICs, FPGAs, or combinations of these (not shown) adapted to execute instructions. The host computer 2402 further comprises software 2410, which is stored in or accessible by the host computer 2402 and executable by the processing circuitry 2408. The software 2410 includes a host application 2412. The host application 2412 may be operable to provide a service to a remote user, such as a UE 2414 connecting via an OTT connection 2416 terminating at the UE 2414 and the host computer 2402. In providing the service to the remote user, the host application 2412 may provide user data which is transmitted using the OTT connection 2416.

The communication system 2400 further includes a base station 2418 provided in a telecommunication system and comprising hardware 2420 enabling it to communicate with the host computer 2402 and with the UE 2414. The hardware 2420 may include a communication interface 2422 for setting up and maintaining a wired or wireless connection with an interface of a different communication device of the communication system 2400, as well as a radio interface 2424 for setting up and maintaining at least a wireless connection 2426 with the UE 2414 located in a coverage area (not shown in FIG. 24) served by the base station 2418. The communication interface 2422 may be configured to facilitate a connection 2428 to the host computer 2402. The connection 2428 may be direct or it may pass through a core network (not shown in FIG. 24) of the telecommunication system and/or through one or more intermediate networks outside the telecommunication system. In the embodiment shown, the hardware 2420 of the base station 2418 further includes processing circuitry 2430, which may comprise one or more programmable processors, ASICs, FPGAs, or combinations of these (not shown) adapted to execute instructions. The base station 2418 further has software 2432 stored internally or accessible via an external connection.

The communication system 2400 further includes the UE 2414 already referred to. The UE's 2414 hardware 2434 may include a radio interface 2436 configured to set up and maintain a wireless connection 2426 with a base station serving a coverage area in which the UE 2414 is currently located. The hardware 2434 of the UE 2414 further includes processing circuitry 2438, which may comprise one or more programmable processors, ASICs, FPGAs, or combinations of these (not shown) adapted to execute instructions. The UE 2414 further comprises software 2440, which is stored in or accessible by the UE 2414 and executable by the processing circuitry 2438. The software 2440 includes a client application 2442. The client application 2442 may be operable to provide a service to a human or non-human user via the UE 2414, with the support of the host computer 2402. In the host computer 2402, the executing host application 2412 may communicate with the executing client application 2442 via the OTT connection 2416 terminating at the UE 2414 and the host computer 2402. In providing the service to the user, the client application 2442 may receive request data from the host application 2412 and provide user data in response to the request data. The OTT connection 2416 may transfer both the request data and the user data. The client application 2442 may interact with the user to generate the user data that it provides.

Figure 24:
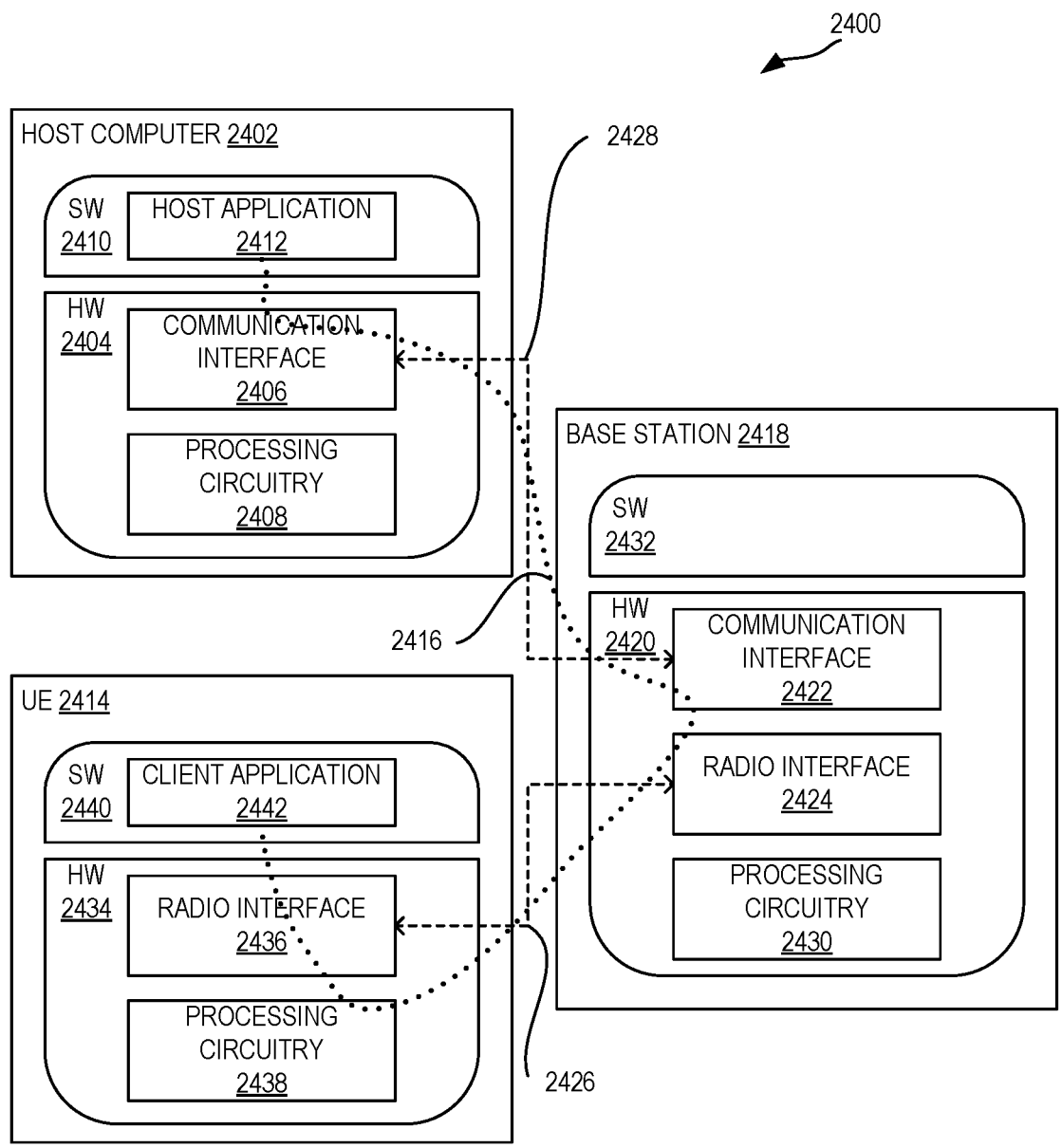
FIG. 24 illustrates example implementations of the host computer, base station, and UE of FIG. 23.

It is noted that the host computer 2402, the base station 2418, and the UE 2414 illustrated in FIG. 24 may be similar or identical to the host computer 2316, one of the base stations 2306A, 2306B, 2306C, and one of the UEs 2312, 2314 of FIG. 23, respectively. This is to say, the inner workings of these entities may be as shown in FIG. 24 and independently, the surrounding network topology may be that of FIG. 23.

In FIG. 24, the OTT connection 2416 has been drawn abstractly to illustrate the communication between the host computer 2402 and the UE 2414 via the base station 2418 without explicit reference to any intermediary devices and the precise routing of messages via these devices. The network infrastructure may determine the routing, which may be configured to hide from the UE 2414 or from the service provider operating the host computer 2402, or both. While the OTT connection 2416 is active, the network infrastructure may further take decisions by which it dynamically changes the routing (e.g., on the basis of load balancing consideration or reconfiguration of the network).

The wireless connection 2426 between the UE 2414 and the base station 2418 is in accordance with the teachings of the embodiments described throughout this disclosure. One or more of the various embodiments improve the performance of OTT services provided to the UE 2414 using the OTT connection 2416, in which the wireless connection 2426 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 2416 between the host computer 2402 and the UE 2414, in response to variations in the measurement results. The measurement procedure and/or the network functionality for reconfiguring the OTT connection 2416 may be implemented in the software 2410 and the hardware 2404 of the host computer 2402 or in the software 2440 and the hardware 2434 of the UE 2414, or both. In some embodiments, sensors (not shown) may be deployed in or in association with communication devices through which the OTT connection 2416 passes; the sensors may participate in the measurement procedure by supplying values of the monitored quantities exemplified above, or supplying values of other physical quantities from which the software 2410, 2440 may compute or estimate the monitored quantities. The reconfiguring of the OTT connection 2416 may include message format, retransmission settings, preferred routing, etc.; the reconfiguring need not affect the base station 2418, and it may be unknown or imperceptible to the base station 2418. Such procedures and functionalities may be known and practiced in the art. In certain embodiments, measurements may involve proprietary UE signaling facilitating the host computer 2402's measurements of throughput, propagation times, latency, and the like. The measurements may be implemented in that the software 2410 and 2440 causes messages to be transmitted, in particular empty or 'dummy' messages, using the OTT connection 2416 while it monitors propagation times, errors, etc.

FIG. 25 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 25 will be included in this section. In step 2500, the host computer provides user data. In sub-step 2502 (which may be optional) of step 2500, the host computer provides the user data by executing a host application. In step 2504, the host computer initiates a transmission carrying the user data to the UE. In step 2506 (which may be optional), the base station transmits to the UE the user data which was carried in the transmission that the host computer initiated, in accordance with the teachings of the embodiments described throughout this disclosure. In step 2508 (which may also be optional), the UE executes a client application associated with the host application executed by the host computer.

FIG. 26 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 26 will be included in this section. In step 2600 of the method, the host computer provides user data. In an optional sub-step (not shown) the host computer provides the user data by executing a host application. In step 2602, the host computer initiates a transmission carrying the user data to the UE. The transmission may pass via the base station, in accordance with the teachings of the embodiments described throughout this disclosure. In step 2604 (which may be optional), the UE receives the user data carried in the transmission.

Figures 27, 28:
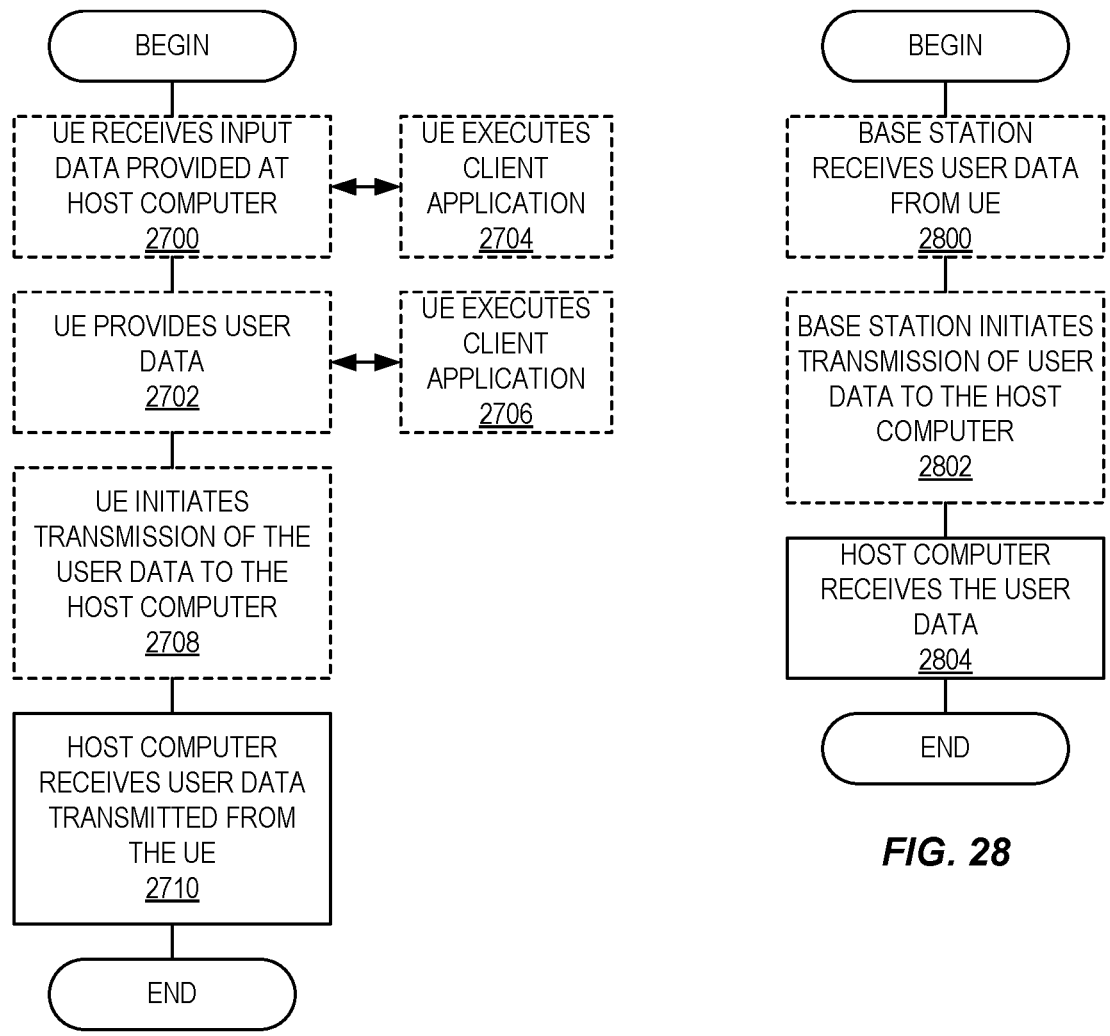

FIG. 27 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 27 will be included in this section. In step 2700 (which may be optional), the UE receives input data provided by the host computer. Additionally or alternatively, in step 2702, the UE provides user data. In sub-step 2704 (which may be optional) of step 2700, the UE provides the user data by executing a client application. In sub-step 2706 (which may be optional) of step 2702, the UE executes a client application which provides the user data in reaction to the received input data provided by the host computer. In providing the user data, the executed client application may further consider user input received from the user. Regardless of the specific manner in which the user data was provided, the UE initiates, in sub-step 2708 (which may be optional), transmission of the user data to the host computer. In step 2710 of the method, the host computer receives the user data transmitted from the UE, in accordance with the teachings of the embodiments described throughout this disclosure.

FIG. 28 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 28 will be included in this section. In step 2800 (which may be optional), in accordance with the teachings of the embodiments described throughout this disclosure, the base station receives user data from the UE. In step 2802 (which may be optional), the base station initiates transmission of the received user data to the host computer. In step 2804 (which may be optional), the host computer receives the user data carried in the transmission initiated by the base station.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method performed by a wireless device for random access, the method comprising: performing an open-loop timing advance estimation procedure to thereby determine an open-loop timing advance estimate for an uplink between the wireless device and a base station; transmitting a random access preamble using the open-loop timing advance estimate.

Embodiment 2: The method of embodiment 1 further comprising: receiving, from the base station, a random access response comprising a timing advance value; and determining a timing advance for the uplink between the wireless device and the base station based on the timing advance value comprised in the random access response and the open-loop timing advance estimate.

Embodiment 3: The method of embodiment 2 wherein the random access response schedules resources for an uplink transmission from the wireless device, and the method further comprises: transmitting an uplink transmission to the base station using the scheduled resources and the determined timing advance, the uplink transmission comprising an identity of the wireless device and an indication of the open-loop timing advance estimate.

Embodiment 4: The method of embodiment 3 wherein the indication of the open-loop timing advance estimate is the open-loop timing advance estimate.

Embodiment 5: The method of embodiment 3 wherein the indication of the open-loop timing advance estimate is a differential value that equals a difference between the open-loop timing advance estimate and a predefined or preconfigured reference value.

Embodiment 6: The method of embodiment 1 wherein the random access preamble is a function of the open-loop timing estimate.

Embodiment 7: The method of embodiment 1 further comprising selecting the random access preamble from a subgroup of a plurality of possibly random access preambles, the subgroup being chosen based on the open-loop timing estimate.

Embodiment 8: The method of embodiment 6 or 7 wherein the random access preamble provides an indication of the open-loop timing advance estimate.

Embodiment 9: The method of any one of embodiments 6 to 7 further comprising: receiving, from the base station, a random access response comprising a timing advance value; and determining a timing advance for the uplink between the wireless device and the base station based on the timing advance value comprised in the random access response and the open-loop timing advance estimate.

Embodiment 10: The method of embodiment 9 wherein the random access response schedules resources for an uplink transmission from the wireless device, and the method further comprises: transmitting an uplink transmission to the base station using the scheduled resources and the determined timing advance, the uplink transmission comprising an identity of the wireless device and information that, together with the random access preamble transmitted by the wireless device, provide an indication of the open-loop timing advance estimate.

Embodiment 11: The method of any one of embodiments 1 to 10 wherein the base station is part of a satellite radio access network comprising a satellite and a gateway that communicatively couples the base station to the satellite.

Embodiment 12: A method performed by a wireless device for random access in a radio access network, the method comprising: transmitting a random access preamble; and receiving, from a base station, a random access response comprising a timing advance value, the timing advance value being greater than 2 ms.

Embodiment 13: The method of embodiment 12 wherein the timing advance value is greater than 10 ms.

Embodiment 14: The method of embodiment 12 wherein the timing advance value is greater than 50 ms.

Embodiment 15: The method of embodiment 12 wherein the timing advance value is greater than 100 ms.

Embodiment 16: The method of any one of embodiments 12 to 15 wherein the timing advance value is within a range of $T_{min}$ to $T_{max}$, wherein $T_{min}$ and/or $T_{max}$ are a function of a deployment of the radio access network.

Embodiment 17: The method of any one of embodiments 12 to 16 wherein the base station is part of a satellite radio access network comprising a satellite and a gateway that communicatively couples the base station to the satellite.

Embodiment 18: The method of embodiment 17 wherein the timing advance value is within a range of $T_{min}$ to $T_{max}$, wherein $T_{min}$ and/or $T_{max}$ are a function of whether the satellite is a LEO, MEO, or GEO.

Embodiment 19: A method performed by a wireless device for random access in a radio access network, the method comprising: receiving, from a base station, a reference timing advance; transmitting a random access preamble using a timing advance that is equal to the reference timing advance.

Embodiment 20: The method of embodiment 19 further comprising receiving, from a base station, a random access response comprising information that, together with the reference timing advance, indicates a timing advance value for the wireless device.

Embodiment 21: The method of embodiment 20 wherein the information comprises a number of slots and a fraction of a slot.

Embodiment 22: The method of any one of embodiments 19 to 21 wherein the base station is part of a satellite radio access network comprising a satellite and a gateway that communicatively couples the base station to the satellite.

Embodiment 23: A method performed by a wireless device for random access in a radio access network, the method comprising: transmitting a random access preamble; and receiving, from a base station, a random access response comprising a timing advance value for subframe boundary alignment.

Embodiment 24: The method of embodiment 23 further comprising transmitting, to the base station, an indication that the wireless device is capable of performing open-loop timing advance estimation.

Embodiment 25: The method of embodiment 24 wherein the indication is transmitted during random access or outside of random access.

Embodiment 26: The method of any one of embodiments 23 to 25 wherein the base station is part of a satellite radio access network comprising a satellite and a gateway that communicatively couples the base station to the satellite.

Embodiment 27: A method performed by a wireless device for random access in a radio access network, the method comprising: transmitting an indication to a base station that the wireless device is capable of performing open-loop timing advance estimation.

Embodiment 28: The method of embodiment 27 wherein the base station is part of a satellite radio access network comprising a satellite and a gateway that communicatively couples the base station to the satellite.

Embodiment 29: A method performed by a wireless device for random access in a radio access network, the method comprising: transmitting a random access preamble; and receiving, from a base station, a random access response comprising information that indicates a processing latency at the base station between reception of the random access preamble by the base station and transmission of the random access response by the base station; estimating a round-trip propagation delay of the wireless device by subtracting the processing latency at the base station from a time duration between transmission of the random access preamble at the wireless device and receiving the random access response at the wireless device.

Embodiment 30: The method of embodiment 29 wherein the base station is part of a satellite radio access network comprising a satellite and a gateway that communicatively couples the base station to the satellite.

Embodiment 31: The method of any of the previous embodiments, further comprising: providing user data; and forwarding the user data to a host computer via the transmission to the base station.

Embodiment 32: A method performed by a base station for enabling random access in a radio access network, the method comprising: detecting a random access preamble from a wireless device; transmitting a random access response comprising a timing advance value; and receiving, from the wireless device, an uplink transmission, the uplink transmission comprising an identity of the wireless device and an indication of the open-loop timing advance estimate.

Embodiment 33: The method of embodiment 32 wherein the base station is part of a satellite radio access network comprising a satellite and a gateway that communicatively couples the base station to the satellite.

Embodiment 34: A method performed by a base station for enabling random access in a radio access network, the method comprising: detecting a random access preamble from a wireless device, the random access preamble being a function of an open-loop timing advance estimate of the wireless device; and transmitting, to the wireless device, a random access response comprising a timing advance value.

Embodiment 35: The method of embodiment 34 wherein the random access preamble is from a subgroup of a plurality of possibly random access preambles, the subgroup being indicative of the open-loop timing estimate.

Embodiment 36: The method of embodiment 34 or 35 wherein the random access preamble provides an indication of the open-loop timing advance estimate.

Embodiment 37: The method of embodiment 34 or 35 further comprising: receiving, from wireless device, an uplink transmission comprising an identity of the wireless device and information that, together with the random access preamble transmitted by the wireless device, provide an indication of the open-loop timing advance estimate.

Embodiment 38: The method of any embodiments 34 to 37 wherein the base station is part of a satellite radio access network comprising a satellite and a gateway that communicatively couples the base station to the satellite.

Embodiment 39: A method performed by a base station for enabling random access in a radio access network, the method comprising: detecting a random access preamble from a wireless device; and transmitting, to the wireless device, a random access response comprising a timing advance value, the timing advance value being greater than 2 ms.

Embodiment 40: The method of embodiment 39 wherein the timing advance value is greater than 10 ms.

Embodiment 41: The method of embodiment 39 wherein the timing advance value is greater than 50 ms.

Embodiment 42: The method of embodiment 39 wherein the timing advance value is greater than 100 ms.

Embodiment 43: The method of any one of embodiments 39 to 42 wherein the timing advance value is within a range of $T_{min}$ to $T_{max}$, wherein $T_{min}$ and/or $T_{max}$ are a function of a deployment of the radio access network.

Embodiment 44: The method of any one of embodiments 39 to 43 wherein the base station is part of a satellite radio access network comprising a satellite and a gateway that communicatively couples the base station to the satellite.

Embodiment 45: The method of embodiment 44 wherein the timing advance value is within a range of $T_{min}$ to $T_{max}$, wherein $T_{min}$ and/or $T_{max}$ are a function of whether the satellite is a LEO, MEO, or GEO.

Embodiment 46: A method performed by a base station for enabling random access in a radio access network, the method comprising: transmitting, to one or more wireless devices, a reference timing advance; detecting a random access preamble from a wireless device; and transmitting, to the wireless device, a random access response comprising information that, together with the reference timing advance, indicates a timing advance value for the wireless device.

Embodiment 47: The method of embodiment 46 wherein the information comprises a number of slots and a fraction of a slot.

Embodiment 48: The method of embodiment 46 or 47 wherein the base station is part of a satellite radio access network comprising a satellite and a gateway that communicatively couples the base station to the satellite.

Embodiment 49: A method performed by a base station for enabling random access in a radio access network, the method comprising: detecting a random access preamble from a wireless device; and transmitting, to the wireless device, a random access response comprising a timing advance value for subframe boundary alignment.

Embodiment 50: The method of embodiment 49 further comprising receiving, from the wireless device, an indication that the wireless device is capable of performing open-loop timing advance estimation.

Embodiment 51: The method of embodiment 50 wherein the indication is received during random access or outside of random access.

Embodiment 52: The method of any one of embodiments 49 to 51 wherein the base station is part of a satellite radio access network comprising a satellite and a gateway that communicatively couples the base station to the satellite.

Embodiment 53: A method performed by a base station for enabling random access in a radio access network, the method comprising: receiving, from a wireless device, an indication that the wireless device is capable of performing open-loop timing advance estimation.

Embodiment 54: The method of embodiment 53 wherein the base station is part of a satellite radio access network comprising a satellite and a gateway that communicatively couples the base station to the satellite.

Embodiment 55: A method performed by a base station for enabling random access in a radio access network, the method comprising: detecting a random access preamble from a wireless device; and transmitting, to the wireless device, a random access response comprising information that indicates a processing latency at the base station between reception of the random access preamble by the base station and transmission of the random access response by the base station.

Embodiment 56: The method of embodiment 55 wherein the base station is part of a satellite radio access network comprising a satellite and a gateway that communicatively couples the base station to the satellite.

Embodiment 57: The method of any of the previous embodiments, further comprising: obtaining user data; and forwarding the user data to a host computer or a wireless device.

Embodiment 58: A wireless device for random access in a radio access network, the wireless device comprising: processing circuitry configured to perform any of the steps of any one of embodiments 1 to 31; and power supply circuitry configured to supply power to the wireless device.

Embodiment 59: A base station for enabling random access in a radio access network, the base station comprising: processing circuitry configured to perform any of the steps of any one of embodiments 32 to 57; and power supply circuitry configured to supply power to the base station.

Embodiment 60: A User Equipment, UE, for random access in a radio access network, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any one of embodiments 1 to 31; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 61: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any one of embodiments 32 to 57.

Embodiment 62: The communication system of the previous embodiment further including the base station.

Embodiment 63: The communication system of the previous 2 embodiments, further including the UE, wherein the UE is configured to communicate with the base station.

Embodiment 64: The communication system of the previous 3 embodiments, wherein: the processing circuitry of the host computer is configured to execute a host application, thereby providing the user data; and the UE comprises processing circuitry configured to execute a client application associated with the host application.

Embodiment 65: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any one of embodiments 32 to 57.

Embodiment 66: The method of the previous embodiment, further comprising, at the base station, transmitting the user data.

Embodiment 67: The method of the previous 2 embodiments, wherein the user data is provided at the host computer by executing a host application, the method further comprising, at the UE, executing a client application associated with the host application.

Embodiment 68: A User Equipment, UE, configured to communicate with a base station, the UE comprising a radio interface and processing circuitry configured to perform the method of the previous 3 embodiments.

Embodiment 69: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any one of embodiments 1 to 31.

Embodiment 70: The communication system of the previous embodiment, wherein the cellular network further includes a base station configured to communicate with the UE.

Embodiment 71: The communication system of the previous 2 embodiments, wherein: the processing circuitry of the host computer is configured to execute a host application, thereby providing the user data; and the UE's processing circuitry is configured to execute a client application associated with the host application.

Embodiment 72: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any one of embodiments 1 to 31.

Embodiment 73: The method of the previous embodiment, further comprising at the UE, receiving the user data from the base station.

Embodiment 74: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any one of embodiments 1 to 31.

Embodiment 75: The communication system of the previous embodiment, further including the UE.

Embodiment 76: The communication system of the previous 2 embodiments, further including the base station, wherein the base station comprises a radio interface configured to communicate with the UE and a communication interface configured to forward to the host computer the user data carried by a transmission from the UE to the base station.

Embodiment 77: The communication system of the previous 3 embodiments, wherein: the processing circuitry of the host computer is configured to execute a host application; and the UE's processing circuitry is configured to execute a client application associated with the host application, thereby providing the user data.

Embodiment 78: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 79: A method implemented in a communication system including a host computer, a base station, and a User Equipment, UE, the method comprising: at the host computer, receiving user data transmitted to the base station from the UE, wherein the UE performs any of the steps of any one of embodiments 1 to 31.

Embodiment 80: The method of the previous embodiment, further comprising, at the UE, providing the user data to the base station.

Embodiment 81: The method of the previous 2 embodiments, further comprising: at the UE, executing a client application, thereby providing the user data to be transmitted; and at the host computer, executing a host application associated with the client application.

Embodiment 82: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 83: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any one of embodiments 32 to 57.

Embodiment 84: The communication system of the previous embodiment further including the base station.

Embodiment 85: The communication system of the previous 2 embodiments, further including the UE, wherein the UE is configured to communicate with the base station.

Embodiment 86: The communication system of the previous 3 embodiments, wherein: the processing circuitry of the host computer is configured to execute a host application; and the UE is configured to execute a client application associated with the host application, thereby providing the user data to be received by the host computer.

Embodiment 87: A method implemented in a communication system including a host computer, a base station, and a User Equipment, UE, the method comprising: at the host computer, receiving, from the base station, user data originating from a transmission which the base station has received from the UE, wherein the UE performs any of the steps of any one of embodiments 1 to 31.

Embodiment 88: The method of the previous embodiment, further comprising at the base station, receiving the user data from the UE.

Embodiment 89: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).
  µs Microsecond
  3GPP 3rd Generation Partnership Project
  5G Fifth Generation
  AP Access Point
  ASIC Application Specific Integrated Circuit
  BS Base Station
  CP Cyclic Prefix
  CPU Central Processing Unit
  eNB Enhanced or Evolved Node B
  FPGA Field Programmable Gate Array
  GEO Geostationary Orbit
  GHz Gigahertz
  gNB New Radio Base Station
  GPS Global Positioning System
  ID Identifier
  IoT Internet of Things
  km Kilometer
  LEO Low Earth Orbit
  LTE Long Term Evolution
  MEO Medium Earth Orbit
  MME Mobility Management Entity
  ms Millisecond
  Msg1 Message 1
  Msg2 Message 2
  Msg3 Message 3
  Msg4 Message 4
  MTC Machine Type Communication
  NGSO Non-Geostationary Orbit
  NR New Radio
  NR-PSS New Radio Primary Synchronization Signal
  NR-SSS New Radio Secondary Synchronization Signal
  OFDM Orthogonal Frequency Division Multiplexing
  OFDMA Orthogonal Frequency Division Multiple Access
  OTT Over-the-Top
  PBCH Physical Broadcast Channel
  PDCCH Physical Downlink Control Channel
  P-GW Packet Data Network Gateway
  PRACH Physical Random Access Channel
  PUCCH Physical Uplink Control Channel
  PUSCH Physical Uplink Share Channel
  RAN Radio Access Network
  RAR Random Access Response
  RA-RNTI Random Access Radio Network Temporary Identifier
  RAT Radio Access Technology
  RS Reference Signal
  SCEF Service Capability Exposure Function
  SI System Information
  SIB System Information Block
  SS Synchronization Signal
  SSB Synchronization Signals/Physical Broadcast Channel Block
  TA Timing Advance
  TR Technical Report
  UE User Equipment Those skilled in the art will recognize improvements and modifications to the embodiments of the present disclosure. All such improvements and modifications are considered within the scope of the concepts disclosed herein.

REFERENCES

[1] TR 38.811, Study on New Radio (NR) to support non-terrestrial networks
[2] RP-181370, Study on solutions evaluation for NR to support non-terrestrial Network

What is claimed is:

1. A method performed by a wireless device for random access, the method comprising:
performing an open-loop timing advance estimation procedure to thereby determine an open-loop timing advance estimate for an uplink between the wireless device and a base station;
transmitting a random access preamble using the open-loop timing advance estimate;
receiving, from the base station, a random access response comprising a timing advance value; and
determining a timing advance for the uplink between the wireless device and the base station based on the timing advance value comprised in the random access response and the open-loop timing advance estimate,
wherein the random access response schedules resources for an uplink transmission from the wireless device, and the method further comprises:
transmitting an uplink transmission to the base station using the scheduled resources and the determined timing advance, the uplink transmission comprising an identity of the wireless device and an indication of the open-loop timing advance estimate,
wherein the indication of the open-loop timing advance estimate is a differential value that equals a difference between the open-loop timing advance estimate and a predefined or preconfigured reference value.

2. The method of claim 1 wherein the indication of the open-loop timing advance estimate is the open-loop timing advance estimate.

3. The method of claim 1 wherein the random access preamble is a function of the open-loop timing advance estimate.

4. The method of claim 3 further comprising selecting the random access preamble from a subgroup of a plurality of possibly random access preambles, the subgroup being chosen based on the open-loop timing advance estimate.

5. The method of claim 3 wherein the random access preamble provides an indication of the open-loop timing advance estimate.

6. The method of claim 3 further comprising:
receiving, from the base station, a random access response comprising a timing advance value; and
determining a timing advance for the uplink between the wireless device and the base station based on the timing advance value comprised in the random access response and the open-loop timing advance estimate.

7. The method of claim 6 wherein the random access response schedules resources for an uplink transmission from the wireless device, and the method further comprises:
transmitting an uplink transmission to the base station using the scheduled resources and the determined timing advance, the uplink transmission comprising an identity of the wireless device and information that, together with a random access preamble transmitted by the wireless device, provide an indication of the open-loop timing advance estimate.

8. The method of claim 1 wherein the base station is part of a satellite radio access network comprising a satellite and a gateway that communicatively couples the base station to the satellite.

9. A method performed by a base station for enabling random access in a radio access network, the method comprising:
detecting a random access preamble from a wireless device;
transmitting a random access response comprising a timing advance value; and
receiving, from the wireless device, an uplink transmission, the uplink transmission comprising an identity of the wireless device and an indication of an open-loop timing advance estimate utilized by the wireless device to transmit the random access preamble,
wherein the indication of the open-loop timing advance estimate is a differential value that equals a difference between the open-loop timing advance estimate and a predefined or preconfigured reference value.

10. The method of claim 9 wherein the base station is part of a satellite radio access network comprising a satellite and a gateway that communicatively couples the base station to the satellite.

11. A method performed by a base station for enabling random access in a radio access network, the method comprising:
detecting a random access preamble from a wireless device, the random access preamble being a function of an open-loop timing advance estimate of the wireless device; and
transmitting, to the wireless device, a random access response comprising a timing advance value,
wherein the random access preamble is from a subgroup of a plurality of possibly random access preambles, the subgroup being indicative of the open-loop timing advance estimate.

12. The method of claim 11 wherein the random access preamble provides an indication of the open-loop timing advance estimate.

13. The method of claim 11 further comprising:
receiving, from the wireless device, an uplink transmission comprising an identity of the wireless device and information that, together with the random access preamble transmitted by the wireless device, provide an indication of the open-loop timing advance estimate.

14. The method of claim 11 wherein the base station is part of a satellite radio access network comprising a satellite and a gateway that communicatively couples the base station to the satellite.

* * * * *